United States Patent [19]

French et al.

[11] Patent Number: 5,526,483

[45] Date of Patent: Jun. 11, 1996

[54] FAST NETWORK FILE SYSTEM RUNNING OVER A HYBRID CONNECTIONLESS TRANSPORT

[75] Inventors: Steven M. French, Austin; Everett A. McCassey, II, Florence; Gregory L. Morris, Round Rock, all of Tex.

[73] Assignee: International Business Machines Corporation, Armonk, N.Y.

[21] Appl. No.: 352,264

[22] Filed: Dec. 7, 1994

Related U.S. Application Data

[63] Continuation of Ser. No. 956,715, Oct. 5, 1992, abandoned.

[51] Int. Cl.⁶ .................................................. G06F 15/163
[52] U.S. Cl. .................. 395/182.02; 364/264.5; 364/264.2; 364/284.4; 364/DIG. 1; 395/200.1
[58] Field of Search .................................. 395/800, 575, 395/200, 182.02, 200.01, 800

[56] References Cited

U.S. PATENT DOCUMENTS

| | | | |
|---|---|---|---|
| 4,644,468 | 2/1987 | Doster et al. | 395/200 |
| 4,914,619 | 4/1990 | Harris et al. | 395/200 |
| 5,036,518 | 7/1991 | Tseung | 371/32 |
| 5,073,890 | 12/1991 | Danielsen | 370/58.2 |
| 5,136,716 | 8/1992 | Harvey et al. | 395/800 |
| 5,257,369 | 10/1993 | Skeen | 395/650 |

*Primary Examiner*—Eric Coleman
*Attorney, Agent, or Firm*—Jeffrey S. LaBaw

[57] ABSTRACT

A session-oriented network application dependent on reliable transport of messages on a first system communicates in a new form of connectionless, session-oriented communication called Sideband over a network with a second similar application on a second system. Sideband transport is not guaranteed; Some types of messages and those which are lost must be sent on a reliable, non-Sideband transport. The LAN application contains means to track whether Sideband is both available and enabled on its session with the second application. The application determines whether to disable or reenable the Sideband in its session based on network reliability. As Sideband is fast, but unreliable, the application must be selective about which messages to send Sideband. Messages which would change the state of the receiving system if received twice due to retry of an apparently lost message should not be sent Sideband. The LAN application monitors the responses from the second system to determine whether any messages sent Sideband were lost. In the event of a Sideband message being lost, the application has retry logic which resends the message via a non-Sideband path.

24 Claims, 17 Drawing Sheets

FIG. 5A  NETBIOS Session Frame Header (DLC I-Frame)

These frames are transmitted using DLC connection-oriented services to a specific address.

| MAC HEADER | LLC TYPE 2 HEADER (I) | NETBIOS Header Length | X'EFFF' | Command | Optional Data1 | Optional Data2 | Xmit/Resp Correlator | Dest Num | Source Num |
|---|---|---|---|---|---|---|---|---|---|
| 0 | | 2 | | 4 | 5 | 6 | 8 | 12 | 13 14 |

FIG. 5B  NETBIOS Non-Session Frame Header (DLC UI-Frame) (DATAGRAM)

These frames are transmitted using DLC connectionless services to either a functional address or a specific address.

| MAC HEADER | LLC TYPE 1 HEADER (UI) | NETBIOS Header Length | X'EFFF' | Command | Optional Data1 | Optional Data2 | Xmit/Resp Correlator | Dest Name | Source Name |
|---|---|---|---|---|---|---|---|---|---|
| 0 | | 2 | | 4 | 5 | 6 | 8 | 12 | 28 44 |

FIG. 5C  SIDEBAND

| MAC HEADER | LLC TYPE 1 HEADER (UI) | Sideband Signature | NETBIOS Header Length 0000 | NETBIOS Signature EFFF | Command | Optional Data1 | Optional Data2 | Xmit/Resp Correlators | Dest LSN | Source LSN |
|---|---|---|---|---|---|---|---|---|---|---|
| 0 | | 0F | 1 | 3 | 16 | 00 | 0000 | 0000 0000 | xx | yy |
| | | | | | 5 | 6 | 7 | 9 | 13 14 | 15 |

NetWork Control Block (NCB)

| OFFSET | PARAMETER NAME | BYTE LEN | 8086 TYPE | DESCRIPTION |
|---|---|---|---|---|
| | Note: Field names ending with @ indicate an address throughout this document. | | | |
| 0 | NCB_COMMAND | 1 | DB | Command field |
| 1 | NCB_RETCODE | 1 | DB | Return code |
| 2 | NCB_LSN | 1 | DB | Local session number |
| 3 | NCB_NUM | 1 | DB | Number of application program name |
| 4 | NCB_BUFFER@ | 4 | DD | Pointer to message buffer address (segment:offset) |
| 8 | NCB_LENGTH | 2 | DW | Buffer length in bytes |
| 10 | NCB_CALLNAME | 16 | DB | Name on local or remote NETBIOS. This field has a different use for the CHAIN.SEND commands and RESET command. |
| 26 | NCB_NAME | 16 | DB | Name on local or remote NETBIOS session. This field has a different use for the NCB.RESET command. |

FIG. 11A

| 42 | NCB_RTO | | 1 | DB | Receive timeout |
|----|---------|---|---|----|-----------------|
| 43 | NCB_STO | | 1 | DB | Send timeout |

For all NETBIOS except the Operating System/2 Device Driver Interface:

| 44 | NCB_POST@ | | 4 | DD | Pointer to post routine (segment:offset) or X'00000000' |
|----|-----------|---|---|----|--------|

For NETBIOS using the Operating System/2 Device Driver Interface:

| 44 | NCB_POST@ | | 2 | DB | A value returned to the post routine in register DI (0 = do not post) |
|----|-----------|---|---|----|--------|
| 46 | NCB_DD_ID | | 2 | DB | Device driver identification |

For all NETBIOS:

| 48 | NCB_ADPTR_NUM | 1 | DB | Use X'00' for the primary adapter. Use X'01' for the alternate adapter. |
|----|---------------|---|----|--------|
| 49 | NCB_CMD_CMPL | 1 | DB | Command status |
| 50 | NCB_RESERVE | 14 | DB | Reserved area for all commands except NCB.RESET |

FIG. 11B

FAST NETWORK FILE SYSTEM RUNNING OVER A HYBRID CONNECTIONLESS TRANSPORT

This is a continuation of application Ser. No. 07/956,715 filed Oct. 5, 1992 now abandoned.

BACKGROUND OF THE INVENTION

This invention relates generally to data processing systems in an interconnected environment. More particularly, it relates to an improved method for transmitting small packets of data in a data processing system in an interconnected environment.

It is becoming increasingly prevalent to couple a plurality of data processing systems in an interconnected computing environment such as a Local Area Network (LAN) or Wide Area Network (WAN). The networks are becoming increasingly complicated, with several different LAN networks of different protocols coupled together with the data processing systems from multiple vendors in the network.

To assure that different network technologies can communicate with each other, most vendors provide capability to interface according to the IEEE and International Standard Organization's standards for Local Area Networks. ISO 8802-2 (IEEE Standard 802.2-1989) Logical Link Control Protocol describes the data link layer in a Local Area Network. ISO 8802-3 (IEEE Standard 802.3-1988) describes a bus utilizing CSMA/CD as the access method. ISO 8802-4 (IEEE Standard 802.4-1985) describes a bus utilizing token passing as the access method. ISO 8802-5 (IEEE Standard 802.5-1989) describes a ring utilizing token passing as the access method. ISO 8802-7 describes the ring utilizing a slotted ring as the access method. This family of standards deals with the physical and data link layers as defined by the ISO open systems interconnection reference model.

The data link layer described in ISO 8802-2 consists of a top or logical link control (LLC) sublayer and a bottom layer or medium access control (MAC) sublayer which is defined to complete the functionality of the data link layer to connect to the physical layer. The ISO 8802-2 standard has two LLC protocols for communication between two systems in the network to satisfy a broad range of potential applications. The ISO 8802-2 LLC type 1 protocol is a connectionless protocol with minimum protocol complexity which has no guarantee of delivery to the receiving system and is described in Section 6 of the ISO standard. This mode is useful when the higher layers, e.g., applications, provide any essential recovery and sequences so they do not need replicating in the data link layer. This type of operation also is useful in applications where it is not essential to guarantee the delivery of every data packet. The ISO 8802-2 LLC type 2 protocol is a connection-based protocol for guaranteed delivery. This mode includes support of sequence delivery of data link layer units and a comprehensive set of data link layer recovery techniques. This second type of operation is described in section 7 of the ISO standard. Because many network servers and message transfer interfaces, such as IBM's LAN Server™ and NetBIOS™, call for session-oriented data transfer between two systems on a network, to track transactions for each client, they are generally forced to use a session-level protocol and the 802.2 type 2 protocol on all data transfers. While this data transfer method can be efficient for large messages, for small messages the performance is relatively poor.

SUMMARY OF THE INVENTION

It is therefore an object of the invention to increase throughput and decrease response time for transmission of small network packets for a session oriented LAN application.

This and other objects of the invention are accomplished by a technique which allow LAN applications which are highly dependent on reliable transport of their messages to send their message on an unreliable transport mechanism and to provide a retry technique over an existing reliable transport medium in the event the message is not delivered. The technique uses the knowledge that a network is normally reliable. In one preferred embodiment the LAN application is a Network Operating System (NOS) such as IBM's LAN Server application. Extensions to a LAN application allow the use of an enhanced protocol driver which communicates over the network a new form of connectionless, session-oriented communication called the Sideband, as well as a slower but more reliable connection oriented session oriented protocol. The Sideband is disclosed in commonly assigned application, Ser. No. 07/930,585, entitled "Session Oriented Connectionless Data Transfer For A Computer Network" by Heimsoth et al., filed Aug. 14, 1992.

At each session start-up time, the LAN Application will communicate with the protocol driver to determine if they both support the Sideband. Also, the requestor system on which the LAN application and the enhanced protocol driver are resident will determine if Sideband is supported on the receiving system to which Sideband communication will be sent. If Sideband is fully supported by both systems, Sideband will be activated for the session.

When it comes time to communicate on a session which has Sideband active, the LAN Application may have to use the existing reliable NetBIOS transport Layer, however, a surprisingly high percentage of the traffic can be sent using the Sideband path. Before requesting that a message be sent Sideband, the LAN Application should make several determinations. The LAN Application keeps track of whether the session has Sideband available between the two systems on the network and whether Sideband is enabled at the time the message is to be sent. It also should decide whether the message should be sent Sideband. As Sideband is a fast, but not entirely reliable communication medium, messages which will change the state of the receiving system on retry should not be sent Sideband. If the LAN application decides to send the message Sideband, the protocol driver will check to see if the data meets additional Sideband criteria, e.g., will fit into a single message frame. The protocol driver will attempt to send the message Sideband if it meets the criteria. As Sideband is a connectionless medium, the additional code path needed to set up and track timers and to handle the resend attempts is saved in the protocol.

Responses are important to the type of LAN application code in the present invention. Several additions to the code are important to allow Sideband communication. In session-oriented LAN applications each request elicits a response from the receiving system. A timer or other means is used to determine whether the data packet was lost using Sideband. The LAN Application contains means to resend the data along a non-Sideband path if a response is not received within a designated amount of time.

Sideband is dependent on a reliable network; the LAN application tracks the reliability of the network. In case the network becomes unreliable, the LAN application can enable and disable Sideband for its particular session or connection in accordance with the reliability of the network.

BRIEF DESCRIPTION OF THE DRAWINGS

FIGS. 5B,5C, depict the frame header fields for Session, Datagram and Sideband communication respectively.

FIG. 11 shows the fields in a Network Control Block (NCB).

DETAILED DESCRIPTION OF THE INVENTION

Figure 1:
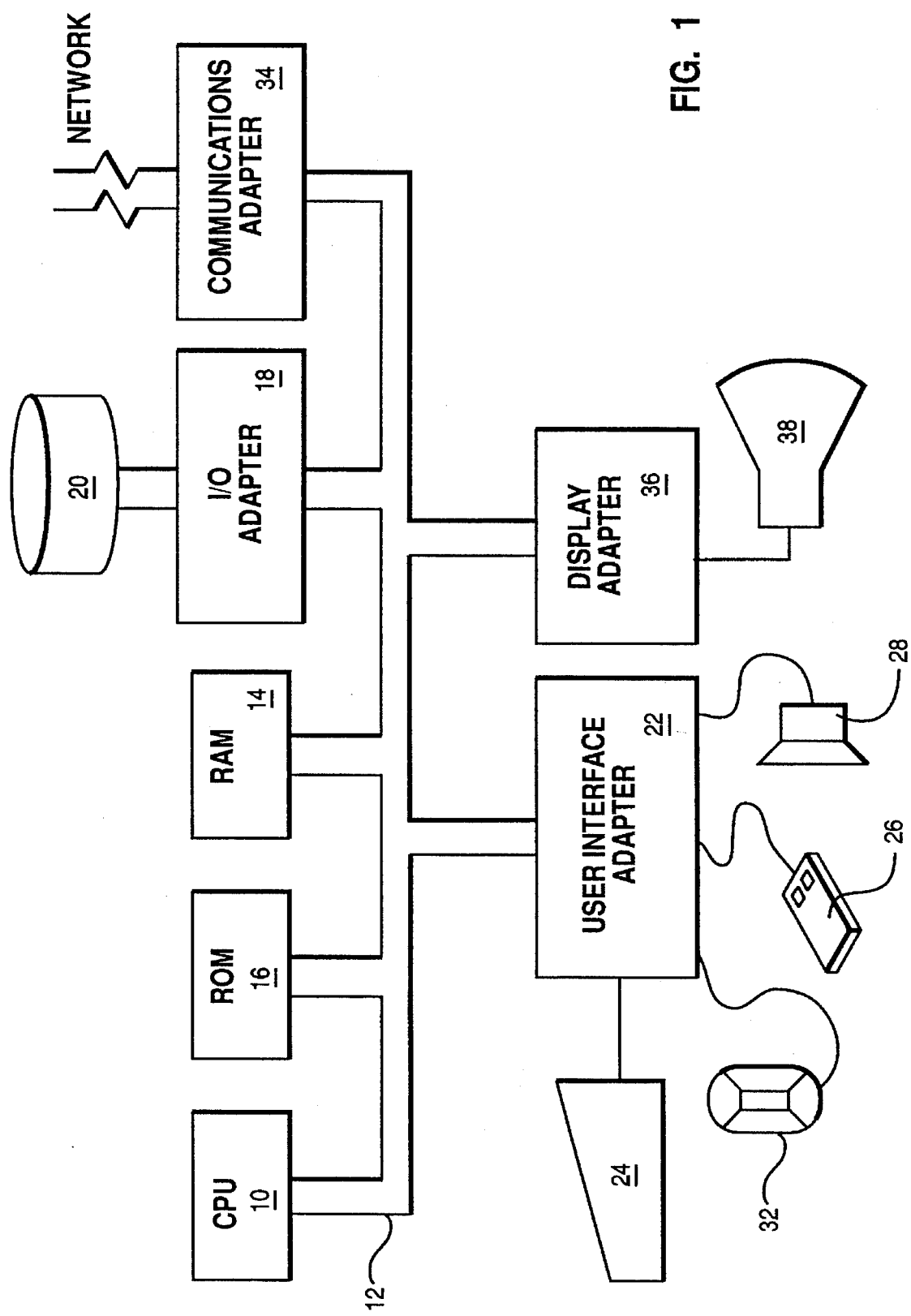
FIG. 1 depicts a typical workstation which would be coupled to a network environment in accordance with the present/invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to display device 38.

The preferred embodiment of the subject invention is an IBM Personal System/2 with the IBM OS/2 operating system installed. Detailed descriptions of the hardware and software environment are provided in *PS/2 Hardware Interface Technical Reference*, S10G-6457, IBM Corporation (1991), and *OS/2 Presentation Manager Programming*, SC28-2700, IBM Corporation (1992). While the invention will be described in terms of this hardware and software, one skilled in the art will recognize that other operating systems and hardware can be supported without undue experimentation. Also resident on the computer system is the OS/2 LAN System Software support including the software making up the subject invention. The system software used in the previous release is described in the following publications available from IBM and incorporated herein by reference: IBM Operating System/2 Local Area Network Server Version 2.0 Information and Planning Guide (G236-0162); IBM Local Area Network Server Programs (Specification Sheet) (G360-2753); and IBM Local Area Network Technical Reference (SC30-3383).

Figure 2:
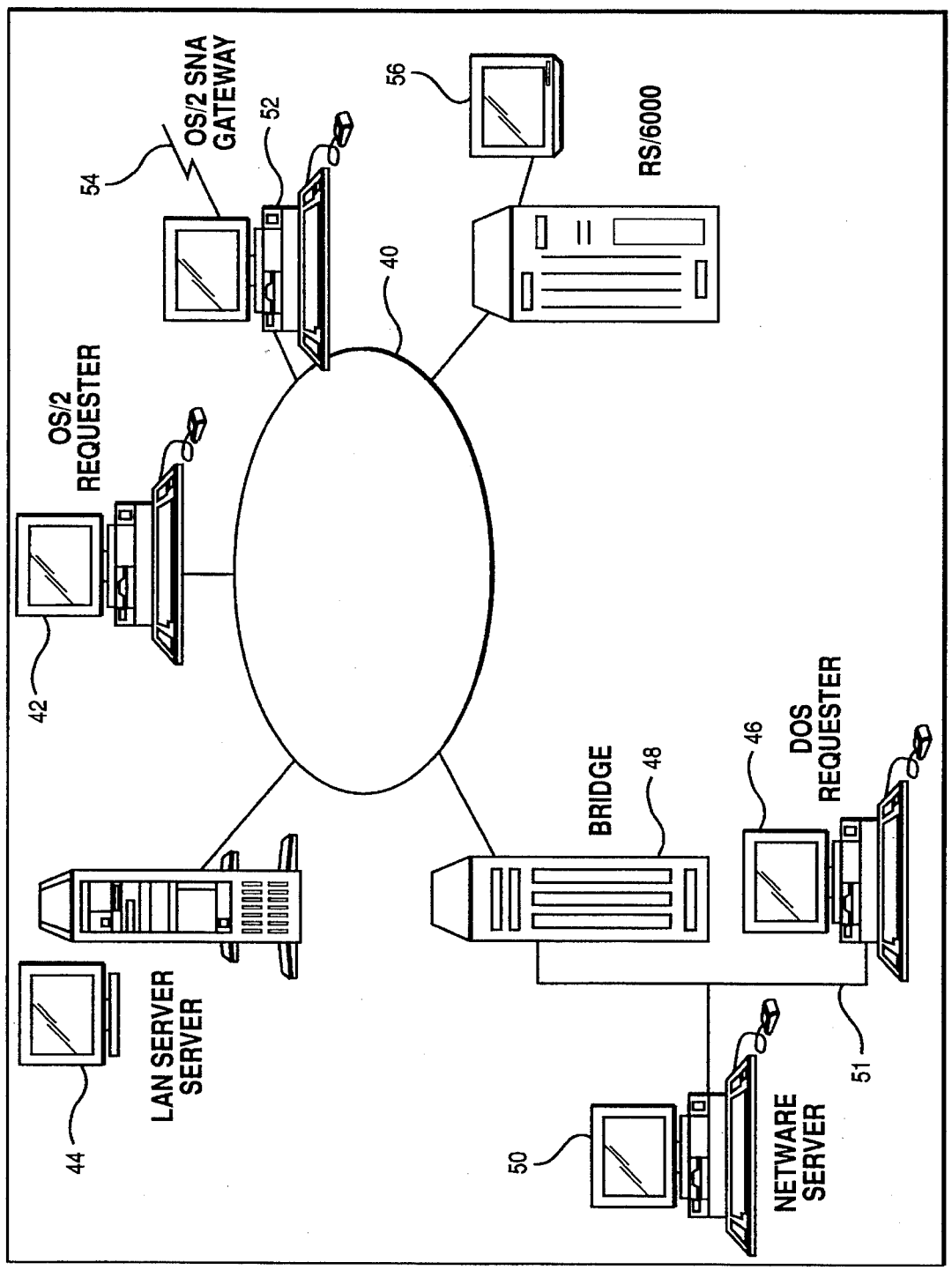
FIG. 2 depicts a plurality of workstations in a network environment according to the present invention.

Interconnected computing environments are becoming much more prevalent. Network environments are becoming more varied, consisting of different LAN technologies, multiple vendors and multiple adapters. There is also a higher performance requirement and a greater need for network management. FIG. 2 is an illustration of a typical computer network environment comprising a plurality of interconnected workstations similar to that shown in FIG. 1.

Figure 3:
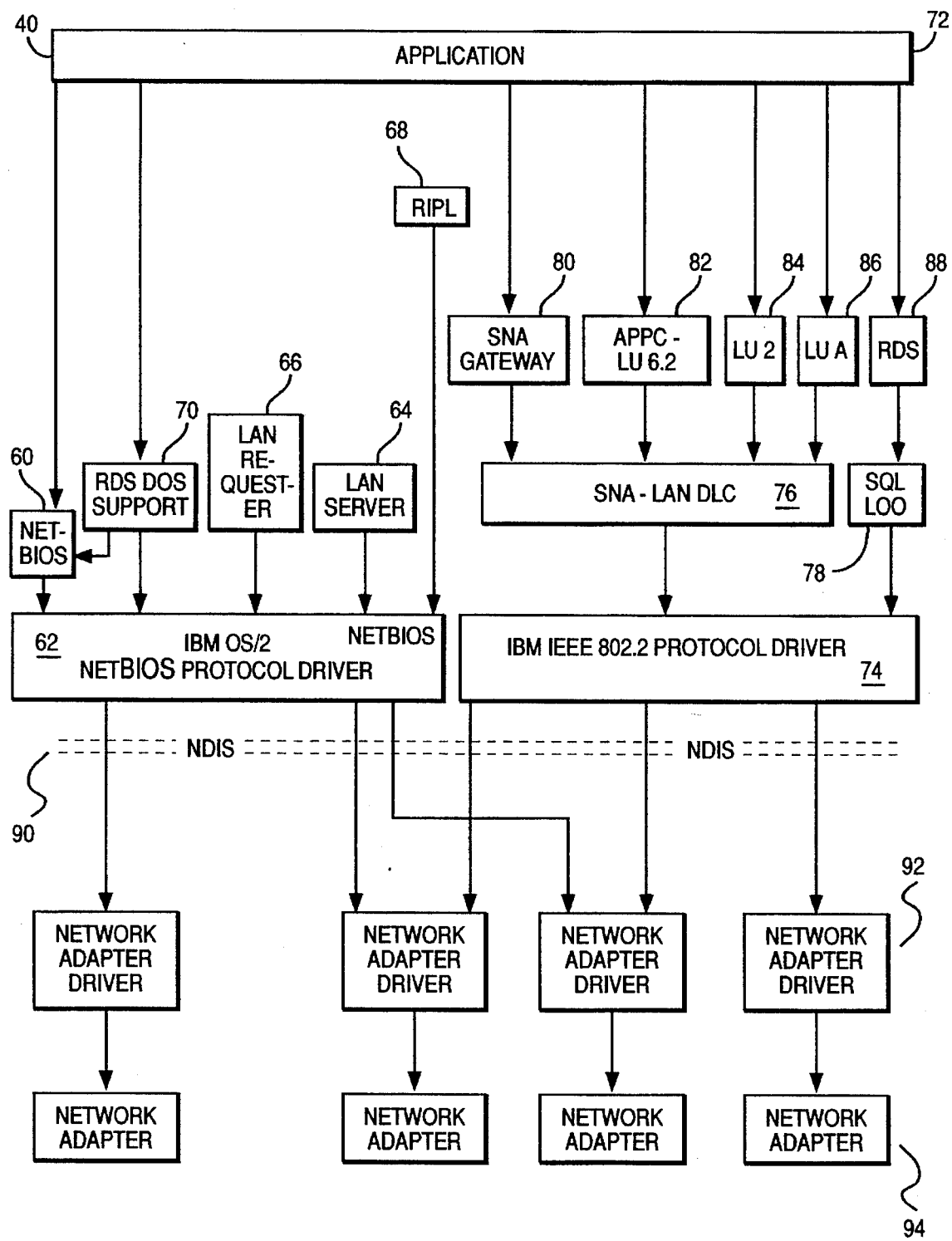
FIG. 3 depicts the code modules in the memory of a workstation using LAN Server and NetBIOS according to ISO 8802-2 and the present invention.

FIG. 2 illustrates a local area network 40 which is preferably a IBM Token Ring, however, it could also be an Ethernet or PC net or other LAN type system. OS/2 requester 42 communicates via LAN 40 to LAN Server server 44 for file sharing, application server database server, print server, communications server and other services. The OS/2 Requester 42 as, might be suspected, runs on the OS/2 2.0 operating system. The DOS Requester 46 communicates by means of Bridge 48 to LAN 40 to request similar services from the LAN Server server 44. The DOS Requester 46 runs on the DOS Operating System 5.0. The Bridge 48 is used couple the DOS Requester 46 and Network Server 50 via Ethernet 51 to the LAN 40. The Netware Server 50 runs on the Novell Netware™ local area network software and provides an example of the level of integration of vendors which is possible in today's local area networks. The OS/2 SNA gateway 52 provides service to the LAN 40 via bus 54 to the other networks which operate on the SNA Protocol. Other gateways could be coupled to the network. Finally, powerful RISC based workstations such as the RISC System/6000 56 can also be coupled to the local area network FIG. 3 illustrates the architectural block diagram of the software applications at least a subset of which would be resident in the RAM access memory of a workstation on the LAN. Generally, this software configuration is known as the LAN adapter and Protocol Support (LAPS) and consists of the network communication software necessary to support LAN connectivity. LAPS is a combination of Network Driver Interface Specification (NDIS) compliant protocol drivers, NDIS compliant network adapter drivers, Application Program Interface (API) support software, and configuration and installation software for the drivers. The IBM Network Basic Input/Output System NetBIOS has been extended to interface to NDIS and to the 802.2 specification.

NetBIOS function is provided by the NetBIOS 60 and the IBM OS/2 NetBIOS Protocol driver or NetBEUI 62. The NetBIOS block 60 provides the mapping functions, mapping OS/2 application calls to the NetBEUI Protocol 62° The NetBIOS Protocol driver 62 takes the NetBEUI mapping or LAN Server or LAN Requester request and processes them according to the NetBIOS Protocol. This protocol is defined in Local Area Network Technical Reference, (SC30-3383-3).

LAN Server 64 performs file sharing, application server, database server and other similar functions for workstations coupled to the local area network. LAN Requester 66 provides the user access to the functions provided by a LAN Server 64 located at a different workstation in a local area network. RDS DOS support 70, supports database functions from the database server product part of the Extended Services for OS/2 2.0. This is a NetBIOS application and would pass its messages through NetBIOS 60 before going to the NetBIOS Protocol driver 62. NetBIOS applications 72 also pass messages directly to NetBIOS 60. There is an advantage in using NetBIOS, rather than the IEEE 802.2 Protocol driver 74 in that the LAN application can be much simpler and it not know all the protocol functions. The IEEE 802.2 Protocol driver 74 performs similar functions as the NetBIOS Protocol driver 62, but according to the IEEE 802.2 Protocol. The NetBIOS Protocol driver 62 has two protocol layers, the NetBIOS protocol layer and the 802.2 Protocol layer. The network protocol drivers 62, 74 provides the communication between an application and a network adapter driver 92. Remote Installation Program Load (RIPL) 68 allows a remote initialization of a workstation from the server. SNA-LAN DLC 76 provides an SNA interface to the 802.2 Protocol. SQL L00 interface 78 provides a fastpath for databases to the 802.2 Protocol driver. Among the API's which utilize the SNA-LAN DLC 76 interface are the SNA gateway 80, the PPC-LU 6.2 API 82, the LU2 API 84 and the LUA API 86. Databases such as remote data services 88, can use the SQL LOO interface 78 to the 802.2 Protocol Driver 74. NDIS 90 is a standardized Medium Access Control (MAC) Interface for network adapter drivers and protocol drivers. NDIS has become an industry standard for network adapters and LAN software to communication with each other. NDIS separates protocol handling from hardware manipulation by defining functions that protocol drivers 62 and 74 and network adapter drivers 92 must provide to each other. NDIS defines specifications for network protocol drivers 62, 74, Adapter drivers 92, and the interfaces between the two and a binding process to link the protocol and adapter drivers. Network Adapter Drivers 92 provide the software interface to network adapters 94, such as the Token Ring Ethernet or PC Net Adapters.

Figure 4A:
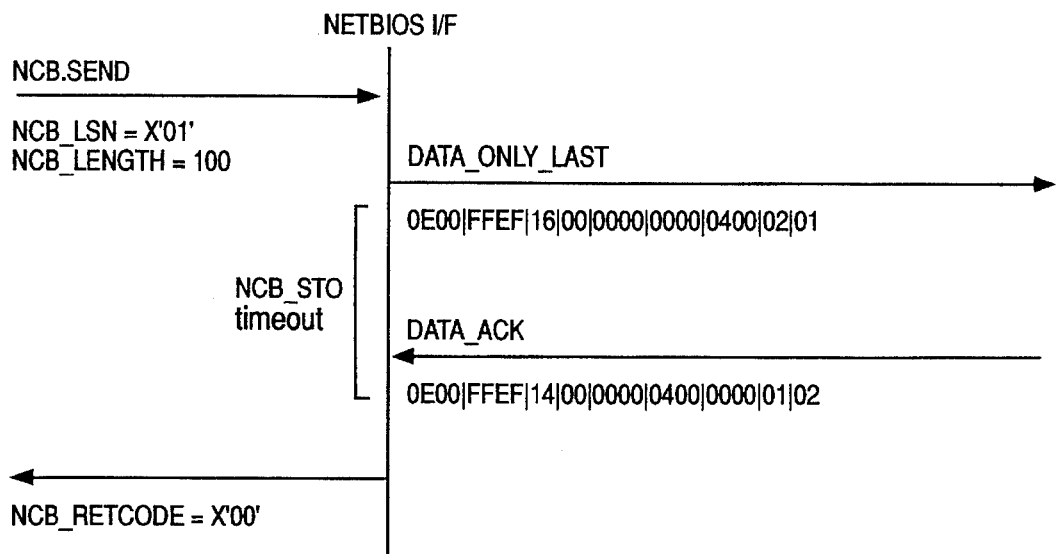
FIGS. 4B,4C, depict communication using NetBIOS session oriented, datagram and Sideband communication modes according to ISO 8802-2.
Figure 4B:
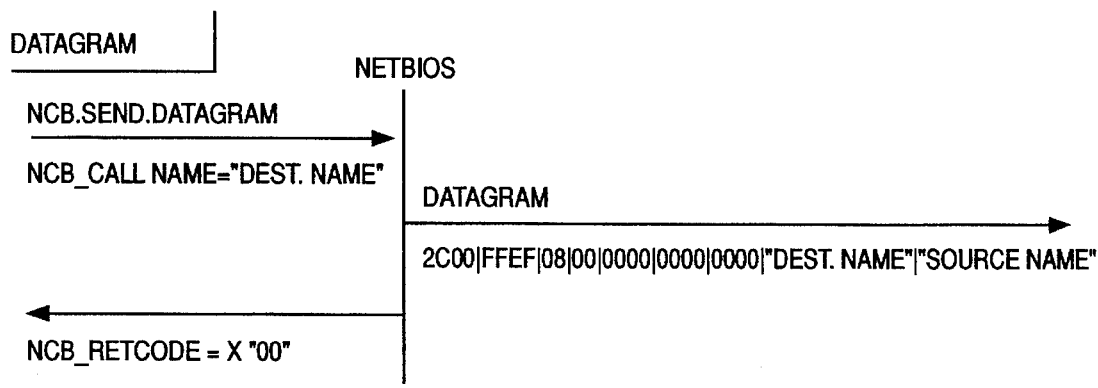
Figure 4C:
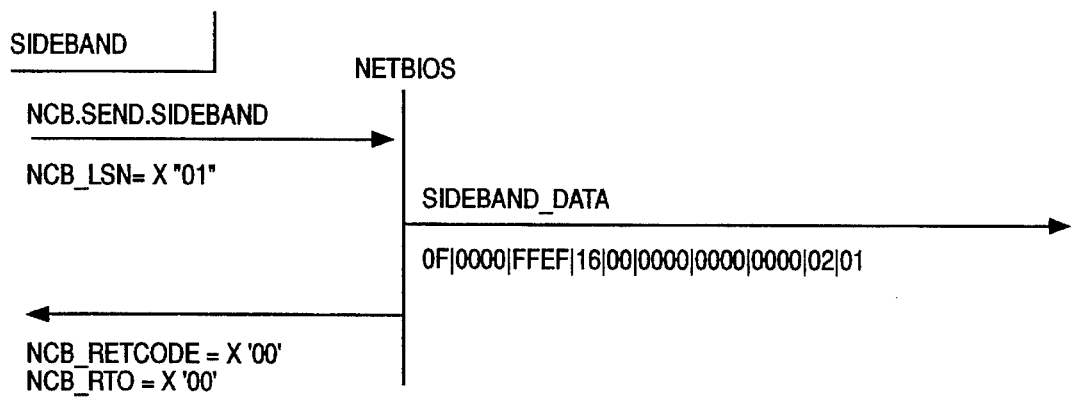

Session, Datagram and Sideband NetBIOS data transmission examples are shown in FIGS. 4A, 4B and 4C respectively. Note that Session data transfer receives an acknowledgement response (DATA_ACK) from the receiving node to the initial data packet (DATA_ONLY_LAST), whereas in the both Datagram and Sideband transfer, no acknowledgement takes place, either at the NetBIOS protocol layer or at the 802.2 protocol layer. This is due to the fact that Session transmission uses ISO 8802-2 LLC type 2 transmission services which requires an LLC response, and NetBIOS Session protocol which requires a NetBIOS response. Datagram and Sideband transfer, on the other hand, use ISO 8802-2 LLC type 1 transmission which does not require an LLC response back from the receiving node. Also, the Datagram and Sideband NetBIOS protocols do not require a NetBIOS response.

At the NetBIOS protocol level, the session is an association of facilities necessary for establishing, maintaining, performing data transfers and releasing logical connections for communications between stations.

The prior art NetBIOS Session protocol performed these functions exclusively on the logical link connections of ISO 8802-2 Type 2 (connection-oriented) protocol. The Sideband NetBIOS protocol allows the data transfer function of the session to be performed on ISO 8802-2 Type 1 (connectionless) protocol. LLC connectionless and connection oriented services are defined in detail in section 2.1 of the ISO 8802-2 standard.

The present invention is preferably embodied in changes to the NetBIOS Protocol Driver 62 and a NetBIOS application such as LAN Server 64 or LAN Requester 66 which make them aware of the Sideband and able to transmit data by the Sideband.

FIGS. 5A, 5B and 5C illustrate session-frame, datagram-frame and Sideband frame, header fields respectively. Both session-level and datagram transmission are known in previous versions of NetBIOS.

NetBIOS session-level data transfer uses NetBIOS send and receive commands for guaranteed delivery of messages. It uses NetBIOS I-frame headers on 802.2 type 2 I-frames for guaranteed delivery. The SESSION Frame Header Fields as shown in FIG. 5A are as follows:

| | |
|---|---|
| MAC header | - Varies with LAN type (IEEE 802.5, 802.3 etc. |
| LLC header | - [ FO FO XX YY ] A normal IEEE 802.2 I frame, type 2, LLC header. |
| (the remaining fields are in the format of a normal NetBIOS I-frame header.) | |
| NetBIOS Header Length | - [ OE 00 ] Specifies a 14-byte NetBIOS header. |
| NetBIOS Signature | - [ FF EF ] Identifies the frame as a NetBIOS frame. |
| Command Code | - [ 15/16 ] Data -First-Middle or Data-Only-Last Command. |
| DATA1 | - No-Ack and Receive - Continue Flags. |
| DATA2 | - Resynk Indicator |
| Xmit Correlator | - Piggyback Ack Correlator or 0(not used) |
| Rcv Correlator | - 2-Byte Correlator from Sender, Used For Acknowledge |
| Destination LSN | - [ session-specific ] 1-byte destination session number. |
| Source LSN | - [ session-specific ] 1-byte source session number |

NetBIOS datagram traffic uses NetBIOS datagraphy and broadcast datagram commands to send non-guaranteed messages, it uses NetBIOS datagram UI headers on top of 802.2 type 1 UI frames. The DATAGRAM Frame Header Fields as shown in FIG. 5B are as follows:

| | |
|---|---|
| MAC | - Varies with LAN type (IEEE 802.5, 802.3 etc.) |
| LLC header | - [ FO FO 03 ] A normal IEEE 802.2 UI frame LLC header, type I. |
| NetBIOS Header Length | - [ 2C 00 ] Specifies a 44-byte NetBIOS header. |
| NetBIOS Signature | - [ FF EF ] Identifies the frame as a NetBIOS frame. |
| Command Code | - [ 8, 9 ] Data-Only-Last command. Indicates the frame is the last piece of the SEND. |
| DATA1 | - [ 00 ] Set to 0 but not used by the receiver. |
| DATA2 | - [ 00 00 ] Set to 0 but not used by the receiver. |
| Xmit Correlator | - [ 00 00 ] Set to 0 but not used by the receiver. |
| Rcv Correlator | - [ 00 00 ] Set to 0 but not used by the receiver. |
| Destination Name | - [ 16-Byte Name of Receiver session number.] |
| Source Name | - [ 16-Byte Name of Sender session number] |

Sideband uses Sideband sends and normal session receive commands to send non-guaranteed, session-oriented data. Sideband uses a NetBIOS I-frame header on top of an 802.2 UI frame on 802.2 type 1 frame with a special field to indicate that it is a Sideband message. The SIDEBAND Frame Header Fields as shown in FIG. 5C as follows:

| | |
|---|---|
| MAC header | - Varies with LAN type (IEEE 802.5, 802.3 etc.) |
| LLC header | - [ FO FO 03 ] A normal IEEE 802.2 UI frame, type 1, LLC header.] |
| SB Signature | - [ OF] A one-byte signature value which can be checked by the receiving NetBIOS protocol to identify the received frame as a Sideband frame. |
| (The remaining fields are in the format of a normal NetBIOS I-frame header.) | |
| NetBIOS Header Length | - [ 00 00 ] Specifies a 14-byte NetBIOS header. |
| NetBIOS Signature | - [ FF EF ] Identifies the frame as a NetBIOS frame. |
| Command Code | - [ 16 ] Data-Only-Last command. Indicates the frame is the last piece of the SEND. |
| DATA1 | - [ 00 00 ] Set to 0 but not used by the receiver. |
| DATA2 | - [ 00 00 ] Set to 0 but not used by the receiver. |
| Xmit correlator | - [ 00 00 ] Set to 0 but not used by the receiver. |
| Rcv Correlator | - [ 00 00 ] Set to 0 but not used by the receiver. |
| Destination LSN | - [ session-specific ] 1-byte destination session number |
| Source LSN | - [session-specific] 1-byte source session number. |

Figure 6:
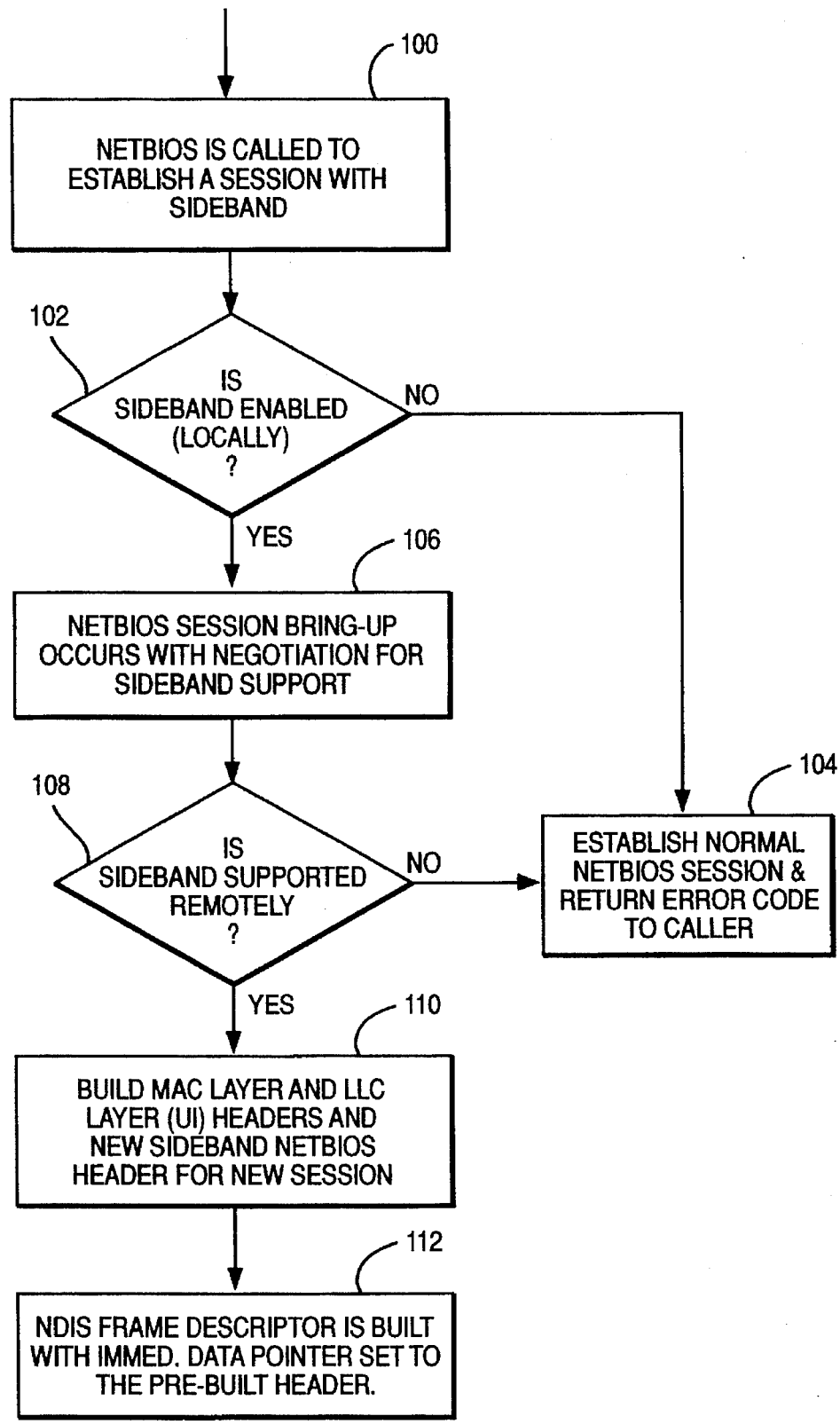
FIG. 6 s a flow diagram for the process for establishing the Sideband session.

FIG. 6 is a flow diagram for the process for establishing the Sideband session. The process begins at step 100 where NetBIOS is called by a NetBIOS application to establish a session using Sideband. The command to establish a session can either be a Sideband listen or a Sideband call. Next, a test is performed to determine whether Sideband is enabled locally in step 102. If not, a normal NetBIOS session is established and an error code is returned to the calling application in step 104. To establish a normal NetBIOS session, the procedures outlined in Chapter 5 of the LAN Technical Reference (SC30-3383) are followed. If Sideband is enabled locally, the NetBIOS session is initiated. Sideband support is negotiated in Step 106. Establishing a Sideband session is similar to establishing a normal NetBIOS Session in step 104, except that an additional negotiation on a single bit is required for Sideband support. Next, a test is performed to determine whether Sideband is supported remotely in Step 108. If not, the normal NetBIOS session is established in Step 104. If it is supported remotely, the Sideband session control block is built with a connectionless header in steps 110 and 112. First, a Medium Access Control (MAC) layer and LCC layer UI Type 1 header and the new Sideband header for that session are built in step 110. Next in step 112, the NDIS frame descriptor is built with immediate data pointers set to the prebuilt header built in the previous step.

Sideband availability can be determined on both ends of a session which is being established. Three methods were discussed to handle this, two of the methods being implemented by the NetBIOS protocol driver, and the third would have to be done by LAN Server. The first method is for the NetBIOS protocol driver code to determine availability at CALL/LISTEN time of the session setup using a new bit, and then to pass the new bit to LAN Server using a return code. Most of the new coding would be in NetBIOS, LAN Server would merely add the code needed to handle the new return code. The second method would be to use a SESSION_ALIVE call, and if a response is received, then Sideband is available. The third method is for LAN Server to use a new Server Message Block (SMB) protocol to handle the Sideband availability determinations.

Figure 7:
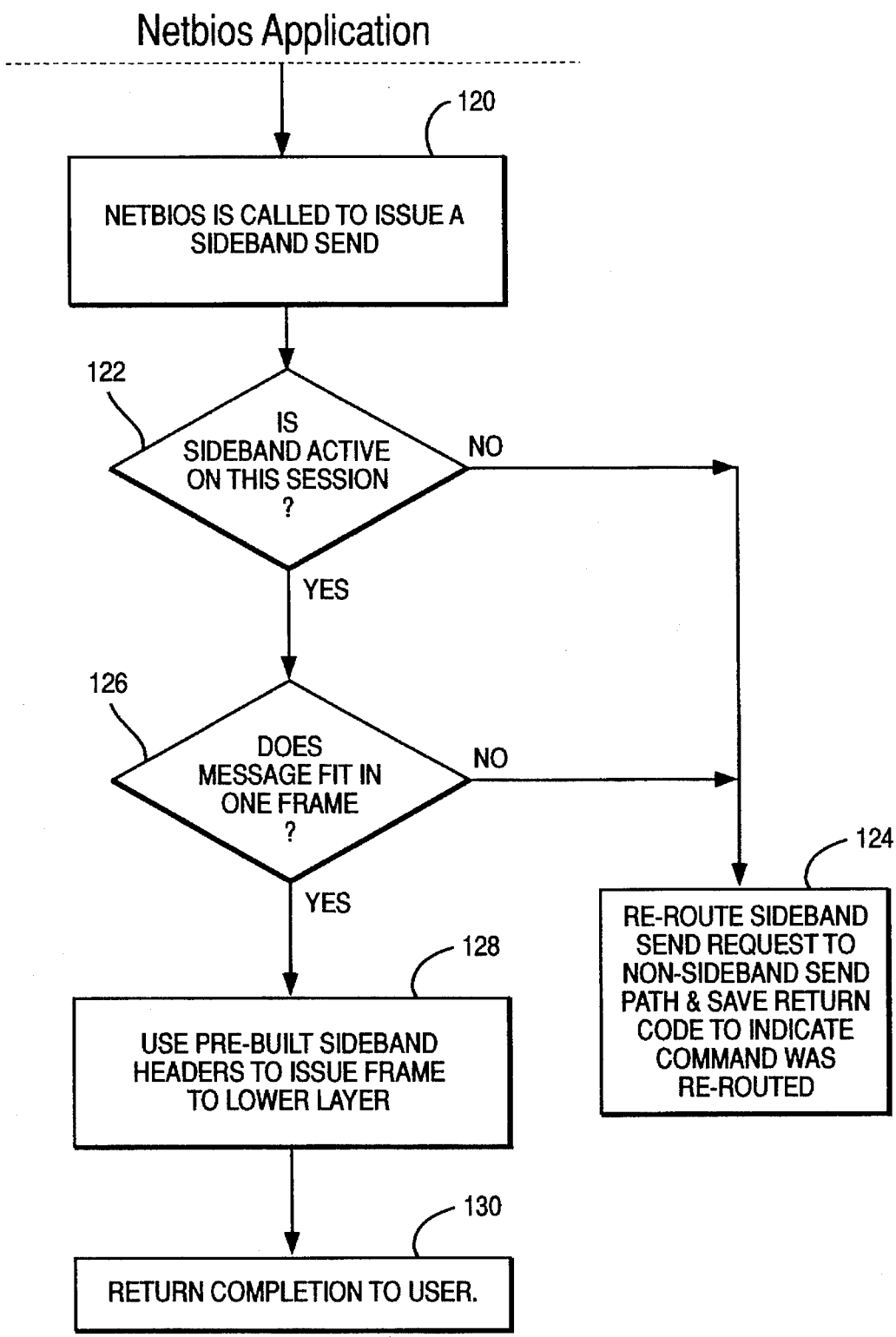
FIG. 7 Tis a flow diagram for sending a message by Sideband.

Once the Sideband session is established and the Sideband message header is built, NetBIOS is ready to issue a Sideband send command. The process flow for a Sideband Send is illustrated in the flow diagram in FIG. 7. NetBIOS is called by a NetBIOS application to issue a Sideband send command in step 120. Next, a test is performed to determine whether Sideband is active in this session in Step 122. If not, the Sideband send request is rerouted to a non-Sideband send path in step 124. A save return code is saved so that when the response to the initial message is made, the save return code is returned to indicate that the send request was sent on a non-Sideband path. If Sideband is active on the session, a second test is performed to determine whether the message will fit in one frame in Step 126. If not, the message is rerouted to a non-Sideband send as described in step 124. If the message does fit in one frame, the prebuilt Sideband headers as described in Steps 110 and 112 in FIG. 6, are used to issue the frames to the lower level, for example, the NDIS level. Finally, a completion code is returned to LAN Application which requested the Sideband Send in Step 130.

In the preferred embodiment, the network only uses Sideband if the data packet is small, i.e., it fits in one Medium Access Control (MAC) frame. The MAC frames are used to communicate off the LAN and are described in the ISO 8802-3, 8802-4, 8802-5, 8802-7 standards. This determination could be made by either an application such as the LAN Server code or by the NetBIOS protocol driver code as modified for the invention. For the LAN Server code to determine the size of the data packet, an interface is established by which the NetBIOS protocol driver would return the maximum space available for data in a network packet. LAN Server code would then subtract from this amount however much space is needed for the SMB and other header information, and then determine if the data to be sent would fit in the remaining storage space. Alternatively and preferably, the enhanced NetBIOS protocol driver code determines the size of the data packet. This eliminates the need for the interface to the LAN Server. It also reduces the decision path to be limited to one place (in the NetBIOS protocol driver) as opposed to at least two places (in the Ring O Server and in the Redirector) which would be necessary in the LAN Server code.

According to the flow diagram, if enhanced NetBIOS determines the data will not fit into a single packet, and it had been asked to send the data on the Sideband path, then it will return an error saying the data did not fit in a single buffer. It will then transfer the data along the non-SB path.

If LAN Server code requests that a piece of data be sent along the Sideband path by the NetBIOS protocol driver, and it is then not sent Sideband, then the NetBIOS protocol driver will notify the sending system and then send the data packet non-Sideband. Three return codes are used to indicate why the data was not sent Sideband. The first will handle the case that Sideband was active, but the data to be sent did not fit into a single MAC packet (SB_ERR_DATA_TOO_LARGE), and the second is for the case that Sideband has been disabled (SB_ERR_SB_DISABLED). The third return code indicates that the MAC layer cannot accept the frame immediately (SB_ERR_MAC_FULL).

A NetBIOS application which is aware of Sideband such as LAN Server must be able to choose when to send a particular data packet using Sideband and will have a means of indicating to the NetBIOS protocol driver which protocol it would like to have used. There are at least three methods for complying with this requirement:

First and preferably, a new set of different command codes indicate to NetBIOS protocol driver that Sideband should be used are defined. New command codes require the use of new Network Control Blocks (NCBs), which both LAN Server and NetBIOS protocol driver handle. NCBs are discussed in Chapter 4 of the LAN Technical Reference. To implement the new command codes without adding a test in each code path, a mapping table was created. Before each send of an NCB, the SB_ENABLED flag is checked, and if it is set, the code executes a few instructions to do the mapping.

Second, a unique entry point and interface could be defined from LAN Server to NetBIOS protocol driver. This option is less preferred since it would therefore require significant code changes in both the LAN Server and NetBIOS protocol driver code.

Third, a register value could be used as a flag for LAN Server to indicate to NetBIOS protocol driver that Sideband is to be used for this request could be defined. This would seem to be the easiest method to implement. The only changes to the LAN Server code path would be to check if Sideband was enabled and to set this register appropriately at the time the NCB command is submitted to NetBIOS protocol driver. The same entry points and command codes will be able to be used without alteration. However, one problem with this would be the possibility of other programs writing to this interface which did not know about Sideband and which did not set or clear this register properly. This could cause unpredictable results. A partial answer to other programs writing to the interface is that the NetBIOS protocol driver will have some indicator to show that Sideband is active and will only check this register if the indicator is set. Any session which is owned by a application which does not know about Sideband will not have this indicator set, since it would not have been able to set up Sideband at session set up time.

Figure 8A:
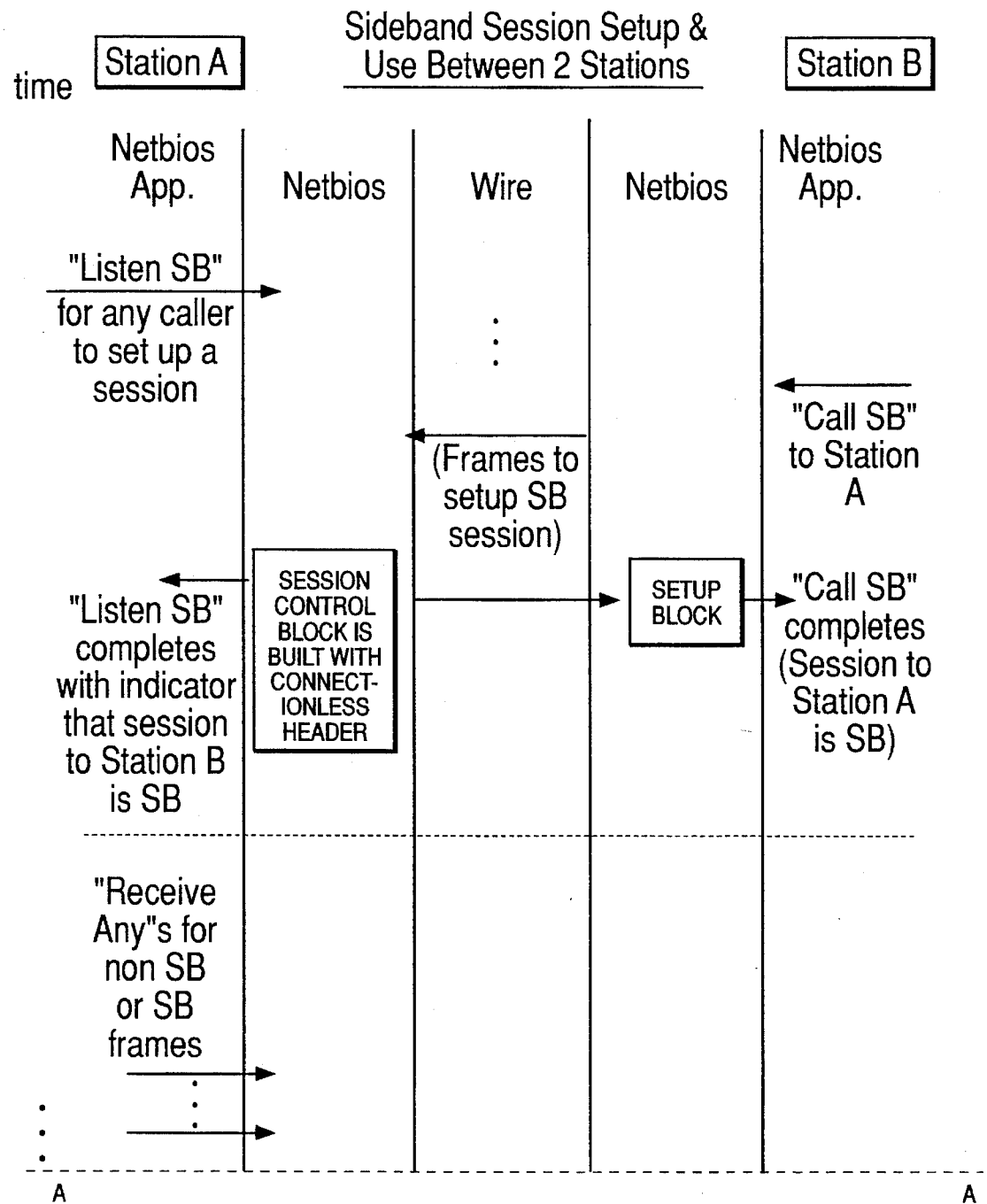
FIG. 8 depicts Sideband communication between two workstation the network.
Figure 8B:
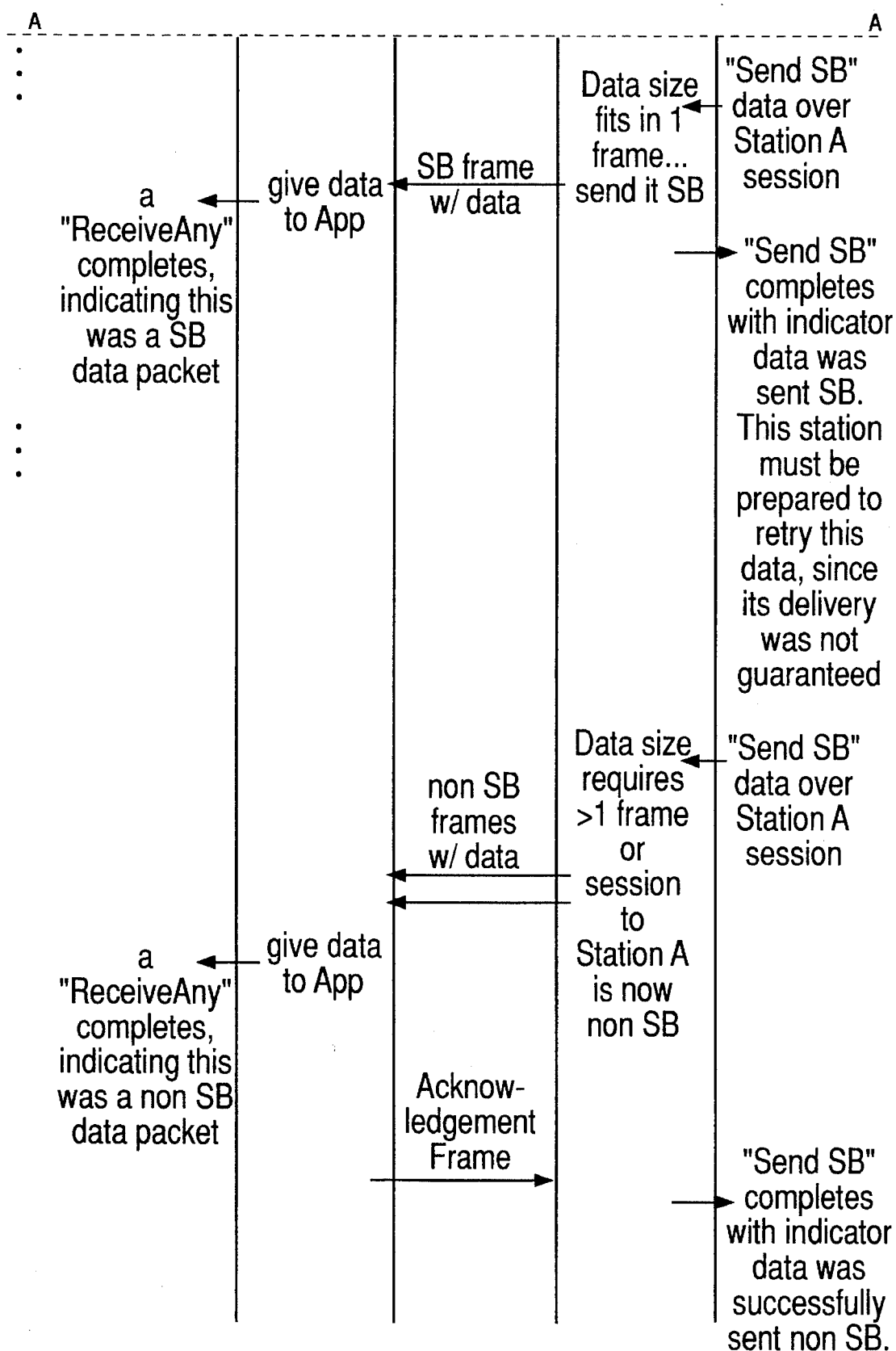

FIG. 8 depicts Sideband session set-up and message passing between workstations A and B according to the present invention. Both workstations A and B have installed NetBIOS and a NetBIOS application such as LAN Server which are modified to handle Sideband. First, at workstation A, the NetBIOS application initiates a Sideband listen command request for any caller to set-up a session. Next, in the diagram, the NetBIOS application at workstation B issues a Sideband call. The Sideband call will result in the normal session initialization sequence where a frame will flow from workstation B to workstation A to request establishing call. Since the listen command has been issued for Sideband at workstation A, the negotiation will take place indicating that Sideband is supported on both sides of the session. Both workstation A and workstation B at the completion of the negotiation will build a session control block containing the Sideband connectionless headers. On workstation A, the Sideband listen will complete and on workstation B the Sideband call will complete, both of which will indicate to the NetBIOS application that a session has been established with Sideband support by using a return field in a NCB.

Next, FIG. 8 illustrates Sideband data transfer. Workstation A will issue a receive any command which will enable it to receive Sideband or non-Sideband messages. Workstation B issues a Sideband send command on the established session on workstation A. The NetBIOS Protocol driver decides that the data fits into one frame and it is on a session that supports Sideband, so the Sideband frame is sent from workstation B to workstation A. At the same time on workstation B, the Sideband send is completed back to the NetBIOS application with an indication that the data was sent on Sideband. On workstation A, the Sideband frame is received and used to complete the receive any command back to the NetBIOS application on workstation A. The receive any command will preferably have a completion code indicating that the data was received on a Sideband frame.

Next, on workstation B, another Sideband send is issued to NetBIOS. In this case, the decision is made that this data does not fit in one frame, and this send is rerouted internally in NetBIOS through the normal non-Sideband send path. Non-Sideband paths generally break the message into separate frames and send the frames on non-Sideband frames to workstation A. Workstation A receives these non-Sideband frames then completes a receive any to the NetBIOS application in workstation A with a return code indicating that the data was not received in non-Sideband frames. The NetBIOS Protocol in workstation A then builds an acknowledgement frame for this non-Sideband message and sends it to workstation B. On Workstation B, the NetBIOS Protocol receives the acknowledgement and completes the Sideband send to the NetBIOS application on workstation B with an indication that the data did not flow Sideband but that the send was successful on non-Sideband.

Once the Sideband control block with a connectionless header is built, it is used throughout the session for Sideband data transfer. This is different from the other NetBIOS prior art transfer methods. In session-oriented data transfer, some of the header could be preserved but, as some header parameters varied with every frame of data, the header would have to be rebuilt with every frame. In datagram data transfer, no header was saved, so the header would also need to be rebuilt with a new datagram. By limiting the amount of information that can be sent Sideband to a data packet that will fit in one frame, the prebuilt connectionless header can be preserved throughout the session. If Sideband transmission were allowed on a data packet which would span two or more frames, some alternate means other than header parameters of piecing data packets together must be devised.

"Sending an application request using the Sideband protocol does not require that the application response be sent Sideband; the converse is also true, an application may send a response Sideband to a request that was sent non-Sideband." For LAN Server, a response is forced to use non-SB mode when a request has been sent non-SB. The receiver must know if a data packet has been sent non-SB or Sideband and to have a way to let the LAN Server code in the receiving machine know which way the data packet was sent. If the system keeps track of whether Sideband is enabled between the redirector and server code, it allows the requesting machine to control when the responding system uses Sideband without an explicit enable/disable mechanism.

In the preferred embodiment, Sideband receives are transparent to the LAN Application. A Receive or Receive Any completion may be satisfied by a Sideband or a non-SB message, and the LAN Application does not necessarily need to know which type of message it was. In other words, any Receive or Receive Any commands which are posted will take any message that is received by NetBIOS protocol driver regardless of whether it came across Sideband or not.

It is useful to have a means for NetBIOS protocol driver to indicate to the LAN Application code on which path the data was received i.e., whether it was sent Sideband or not. This signalling could be handled by a register, some bit being set, or by a different return code.

Figure 9:
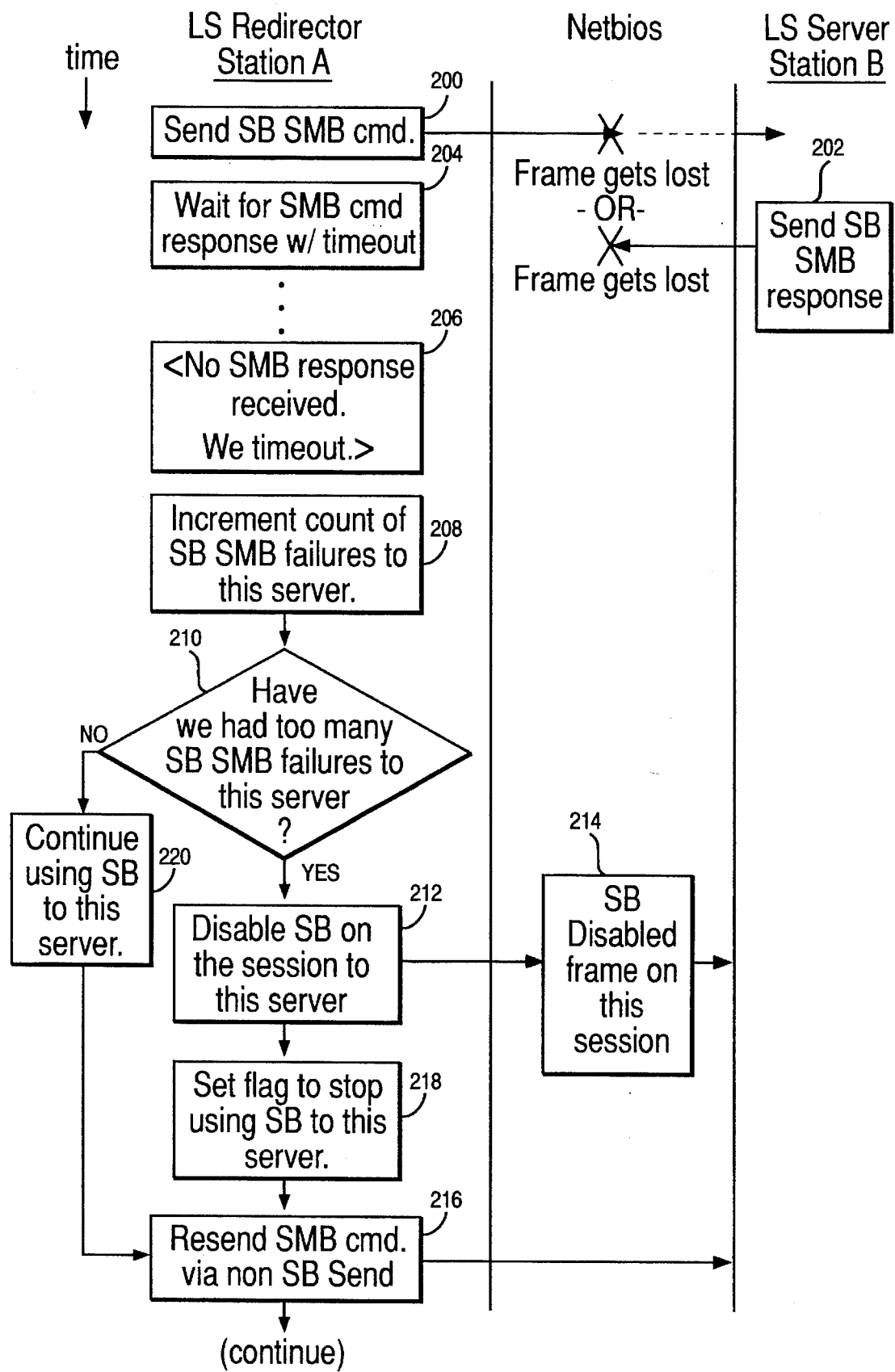
FIG. 9 is a flow diagram to determine whether the network is sufficiently reliable to use Sideband

FIG. 9 is a flow diagram of the procedure to determine whether the network is sufficiently reliable to use Sideband. The determination of reliability is made by a particular NetBIOS application. The fact that Sideband does not guarantee delivery of the message will affect different applications differently. For example, a multimedia application in which a high rate of data transfer in depicting full motion video may be relatively unsusceptible to data loss. If a particular frame, say one frame in thirty is missing, it may not be visually perceptible. Even if the frame is missed, it may be no more than a blink on the screen. Nonetheless, for some session-oriented applications, it will make a great deal of difference whether the message was sent and received.

One example of a session-oriented program which depends on the receipt of messages is the LAN Server Redirector program depicted in FIG. 9 on workstation A. After LAN Redirector sends out a Sideband message in Step 200 via NetBIOS, the frame gets lost either on its way to the workstation B where the LAN Server server is resident or after LAN Server server sends the response back to workstations A in step 202. The LAN Server redirector waits for the SMB command response from LAN Server server with a particular time out in step 204. If no response is received within the specified period, time-out occurs and the message is resent. The retry of the send may be issued Sideband or it may be preferred to be issued non-Sideband as the particular message apparently did not reach its destination in Sideband. Meanwhile, in Step 208, a count is kept of the number of Sideband failures in the session. Once there have been too many Sideband failures, according to a predetermined number of failures within a certain period of time in Step 210, then Sideband is disabled on the session to the server by issuing a command to NetBIOS, in Step 212. NetBIOS sends a frame in Step 214 that Sideband should be disabled on the session in workstation B. Also, the SMB command is sent via a non-Sideband send in Step 216. In Step 218, the Sideband disabled flag is set in the data structure for this session. If there have not been too many Sideband failures, the server continues to use Sideband in Step 220.

As illustrated in FIG. 9, certain NetBIOS applications expect a response generated by another NetBIOS application to their command. In the prior art session-oriented communication, the application would also receive an LCC 2 response and a NetBIOS response, resulting in three responses where one response would do.

Figure 10A:
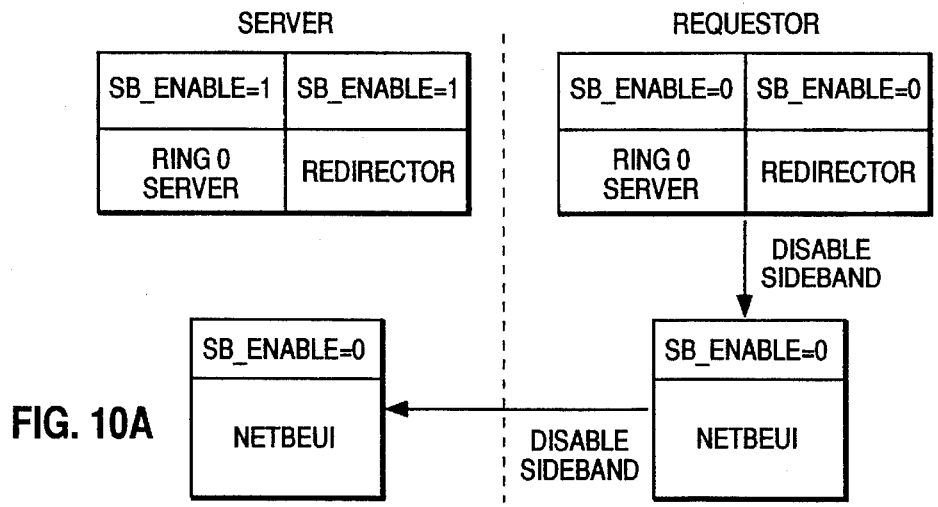
FIGS. 10A,10B,10C, depict disabling and enabling Sideband band across network.
Figure 10B:
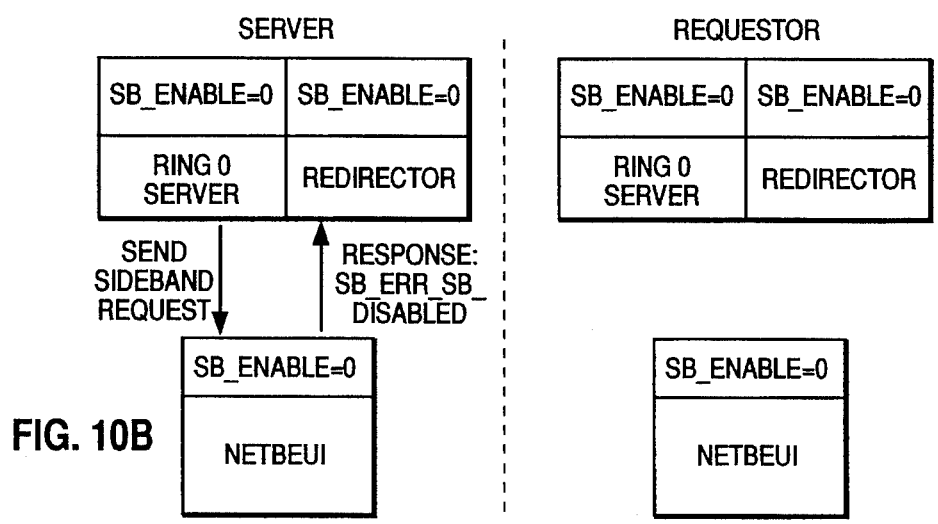
Figure 10C:
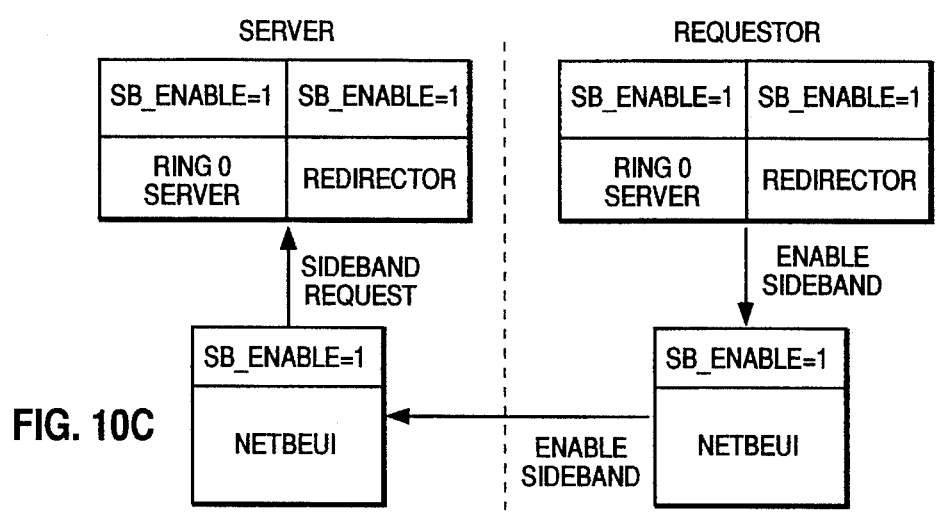

In one preferred embodiment, Sideband will be enabled and disabled by the LAN Server or other Sideband-aware LAN application. If Sideband is enabled or disabled on the sending system, NetBIOS will also issue messages to enable or disable Sideband on the receiving workstation. FIGS. 10A–10C illustrate the machine states in the process flow in FIG. 9 when each machine will notify the NetBIOS protocol driver on the same system and the LAN Server code on the other system of any changes in enable or disable status of the Sideband code. Also the NetBIOS protocol driver on one system will notify the NetBIOS protocol driver on the other machine of changes in the enable or disable status of the Sideband code.

Once the requester machine determines that Sideband must be disabled, it will inform the NetBIOS protocol driver on the local machine, in this case the requester machine and then the NetBIOS protocol driver on the local machine will notify the NetBIOS protocol driver on the remote machine, in this case the server machine. The state at this point is illustrated in FIG. 10A.

The LAN Server Code at the requester machine and the NetBIOS protocol driver at both the requester and server machines now know that Sideband has been disabled. There is no mechanism for the NetBIOS protocol driver to directly indicate to LAN Server on the server machine that Sideband has been disabled. This information will be acquired by the LAN Server code, however, the next time it attempts to send using Sideband. At this time, the NetBIOS protocol driver will return the error SB_ERR_SB_DISABLED, which will be the LAN Server code's indication to disable Sideband on the server machine. The NetBIOS protocol driver will then send the data along the non-SB path. The state after the transaction occurs is illustrated in FIG. 10B.

The method for indicating that Sideband has been reenabled is similar. Once it has been determined that the link is reliable enough to resume using Sideband, the LAN Server code on the requester machine will inform the NetBIOS protocol driver on the local machine, and then the NetBIOS protocol driver on the local machine will notify the NetBIOS protocol driver on the remote machine.

The next time that the NetBIOS protocol driver on the server machine receives a Sideband packet from the requester machine, the NetBIOS protocol driver will notify the LAN Server code on the server machine by setting the indicator to indicate that this packet was received on the Sideband path. This will be the LAN Server code's indication that the requester LAN Server code has reenabled Sideband and that it is now permitted to set the SB_ENABLED indicator on the server machine and to start using Sideband again. The state at this point is illustrated in FIG. 10C.

There are several ways for NetBIOS to notify the LAN Server code that Sideband is enabled again. First, NetBIOS protocol driver will change a return code on a return from a receive or receive any command (RCV/RCV_ANY) to indicate that the data was a Sideband receive or not. Second, a bit or flag can be set in the NCB on SB transfer. Third, NetBIOS protocol driver would actively send a message that Sideband has been reenabled. Fourth, NetBIOS protocol driver could provide a Query_SB NCB for LAN Server to periodically check. Fifth, LAN Server can continue to try Sideband until it stops getting SB_ERR_SB_DISABLED return codes and proceeding as in to send Sideband.

There are also two ways to keep track of whether Sideband is enabled between redirector and server code. First, RO Server gets a NCBDone call and handles and passes the NCB Done call on to the redirector code. It may be necessary for the RO Server to pass this NCB along to the redirector code if there are some data structures that are allocated when Sideband is enabled or if there is an action which the redirector needs to do immediately upon enabling of Sideband. Second, the R0 Server could set a flag in the NCB structure to indicate that Sideband is enabled.

If a Sideband message is sent after Sideband has been disabled at the NetBIOS protocol driver level, the NetBIOS protocol driver will flow the message non-SB, but will return a return code/flag/indicator which will signal that it has been sent non-SB.

This case could occur when the first step of the disabling process described above has occurred, but not the second step. If a Sideband message is not successfully received and responded to in a designated amount of time, then LAN Server will be generally responsible for resending the message along the non-SB path. LAN Server has error handling code to manage a situation when a response is not received after a message has been sent on the Sideband path. Timers are set for each NCB sent on the Sideband path. LAN Server then checks for a response. If no response is sent within a designated amount of time, then the LAN Server code is responsible for resending the NCB along the non-SB path.

When too many failures have occurred on a Sideband session, Sideband will be disabled. LAN Server code is able to keep track of the information about how many packets, which were originally sent Sideband, had to be resent, and use this info as the basis for the determination that too many failures have occurred using Sideband. In this way, calls are not necessary to the NetBIOS protocol driver but would require new data structures to keep track of failures on Sideband.

Once it has been decided that Sideband should be disabled, the process described in the discussion above will be implemented to pass the word that Sideband has been disabled.

At some point, Sideband may eventually be reenabled after being disabled. Generally, LAN Server will also be responsible for the determination when the network is reliable enough to begin using Sideband again. Once this has been decided, the LAN Server code will initiate the enabling process described in the discussion above to start using Sideband again.

LAN Server or another Sideband aware LAN application will set up a table which will contain the NCB command codes to use when Sideband is activated. Most of these NCB codes will be the same as the non-SB codes, but the send related commands will not be the same. It will take 128 bytes to store this table to take into account all possible NCB command codes. When the NCB is about to be sent to NetBIOS protocol driver, a test will determine if Sideband is active, and if it is, convert the code to the Sideband code.

| NCB.SEND.SB | 0X50 |
| NCB.CHAIN.SEND.SB | 0X51 |
| NCB.SEND.NOACK.SB | 0x52 |
| NCB.CHAIN.SEND.NOACK.SB | 0x53 |
| NCB.SENDRCV.SB | 0x54 |
| NCB.CALL.SB | 0x56 |
| NCB.LISTEN.SB | 0x57 |
| NCB.CONTROL.SB | 0X55 |

The fields in an NCB are shown in FIG. 11 and discussed in detail in Chapter four of the LAN Technical Reference (SC30-3383) cited above. All of the Sideband NCBs correspond to their non-Sideband counterparts in that the calling conventions and structures are the same. The return structures are also identical with the following exceptions: For all SEND's, the Receive Timeout field of the NCB structure will contain the Sideband return code as explained below. For all RECEIVE's the Send Timeout field of the NCB structure will contain the Sideband return code.

The Sideband return code can have the following values.

0 Means the frame was sent or received via the Sideband path.

1 Means Sideband was disabled for the session.

2 Means the user had requested a Sideband send or receive, but a non-Sideband send or receive was executed because the data did not fit into a single frame.

3 Means the user had requested a Sideband send or receive, but a non-Sideband send or receive was executed because the MAC Queue was full.

A particular embodiment for a session oriented Network Operating System (NOS), LAN Application, IBM LAN Server, is discussed with reference to FIGS. 12–16. A NOS allows applications on one system in the network to request network resources which are controlled by another system on the network. Those skilled in the art would recognize that other means of controlling access to Sideband and the existing reliable NetBIOS transport would be possible for other applications. While Sideband can be used for non-session oriented LAN applications or session oriented applications which are relatively insensitive to loss of data, Sideband can also be used for a session-oriented LAN application where the loss of data will be catastrophic so long as a reliable non-Sideband path exists to resend any data lost on Sideband. Some details may vary slightly from the examples given above for Sideband.

Figure 12:
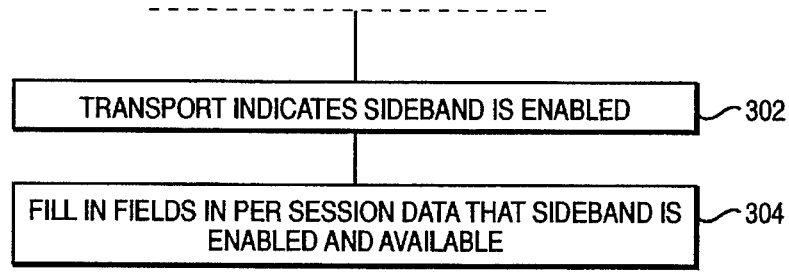
FIG. 12 is a flow diagram of the process to determine if the LAN application session is both Sideband enabled and Sideband available.

Referring to FIG. 12 a flow diagram depicts the process to determine whether the LAN application session has Sideband available and enabled at the time a given message is to be sent. Step 300, in response to an application's request for connection, the LAN Application calls the transport layer or enhanced protocol driver for a Sideband session. Next, the steps as discussed previously in FIG. 6 are performed. Once the Sideband session is established, the protocol driver indicates that the Sideband session is available and enabled in step 302. The LAN Requester then fills in the fields in the internal structure for the session data kept by the LAN application that Sideband is enabled and available, step 304. Once it is established that Sideband is available, that is, supported by both the requester and the server applications and the protocol driver on both sending and receiving machines, the Sideband available bit stays on during the session. The enabled bit is turned on and off as reliability of the network changes.

Figure 13:
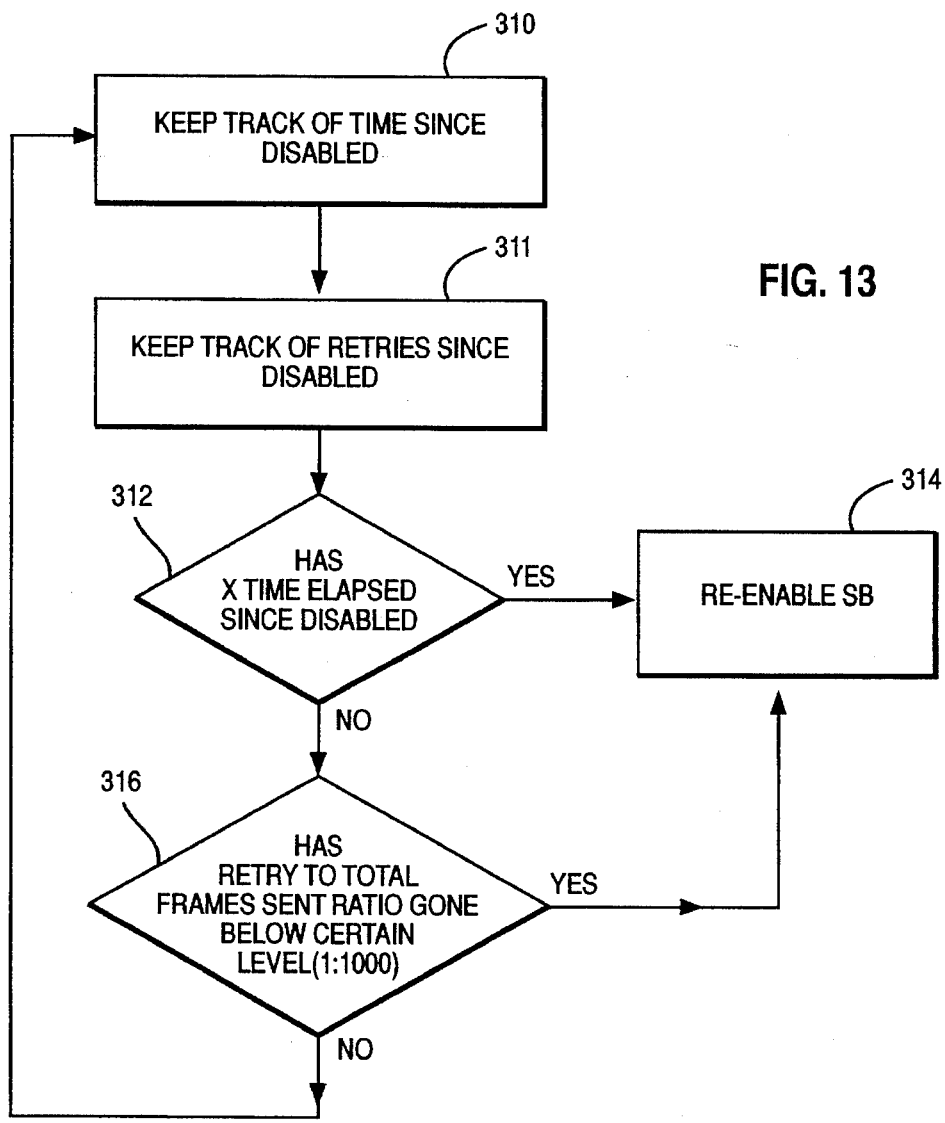
FIG. 13 is a flow diagram for the process to determine whether Sideband should be reenabled on the LAN application session.

FIG. 13 is a flow diagram for the process to determine whether Sideband should be reenabled on the LAN application session, once Sideband is disabled by the LAN application because of network reliability problems. A mechanism is provided to reenable Sideband on LAN application session. In step 310, a timer is set to keep track of the time since Sideband was disabled. Simultaneously, a counter is established to keep track of the number of network retries on non-Sideband communication since the Sideband was disabled, step 311. Next, in step 312, a test is performed to determine whether a predetermined time period has elapsed since Sideband was disabled. If so, in step 314 Sideband is reenabled at the session. If not, a test is performed in step 316 to determine whether the ratio of retries to total frames sent has gone below a certain acceptable level. For example, a 1:1000 ratio would be an acceptable threshold level in a token ring environment. If the retries to total frames ratio is acceptable, Sideband is reenabled in step 314. If not, the process returns to step 310.

Once the LAN application has decided the network is sufficiently reliable to reenable Sideband, it must communicate that decision to the other participants of the session. This process is described above with reference to FIG. 10C on pages 24–25.

Figure 14:
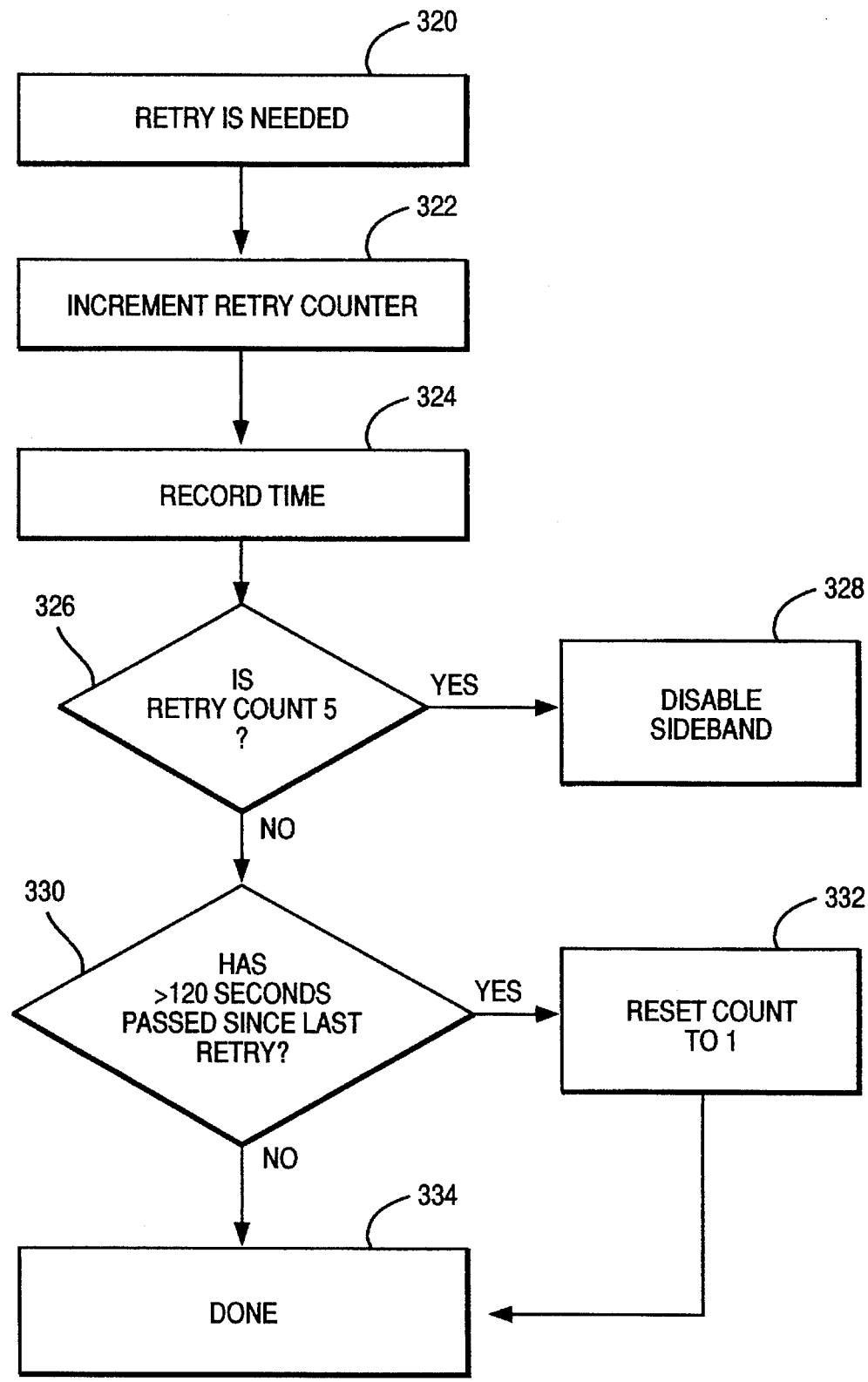
FIG. 14 is a flow diagram to determine whether the LAN application should disable Sideband.

The process steps for determining whether Sideband on the particular LAN Application session should be disabled are depicted in FIG. 14. The criteria can vary according to the desires of the LAN application designer. The IBM LAN Server product is divided into a client portion, LAN Requester and a server portion, LAN Server. For the LAN Requester portion of LAN Server, the standard for determining to disable Sideband is if five Sideband sends were unsuccessful necessitating five non-Sideband retries, where each of two successive retries are no more than 120 seconds apart. If this condition is true, Sideband is disabled.

Referring to FIG. 14, the disable process begins in step 320 where a Sideband send is unsuccessful and a non-Sideband retry is required. In step 322, a retry counter is incremented. In step 324, the time is recorded for this retry. A test is performed in step 326 to determine whether the retry count is equal to five. If so, Sideband is disabled in step 328. If not, a second test is performed in 330 to determine whether 120 seconds have passed since the last retry. If so, the counter is reset to one in step 332. The process ends in step 334.

Once the LAN application has decided that the network is not sufficiently reliable for Sideband, it must communicate that decision to the other participants in the session. This process is described above with reference to FIGS. 10A and 10B on pages 23 and 24.

Figure 15:
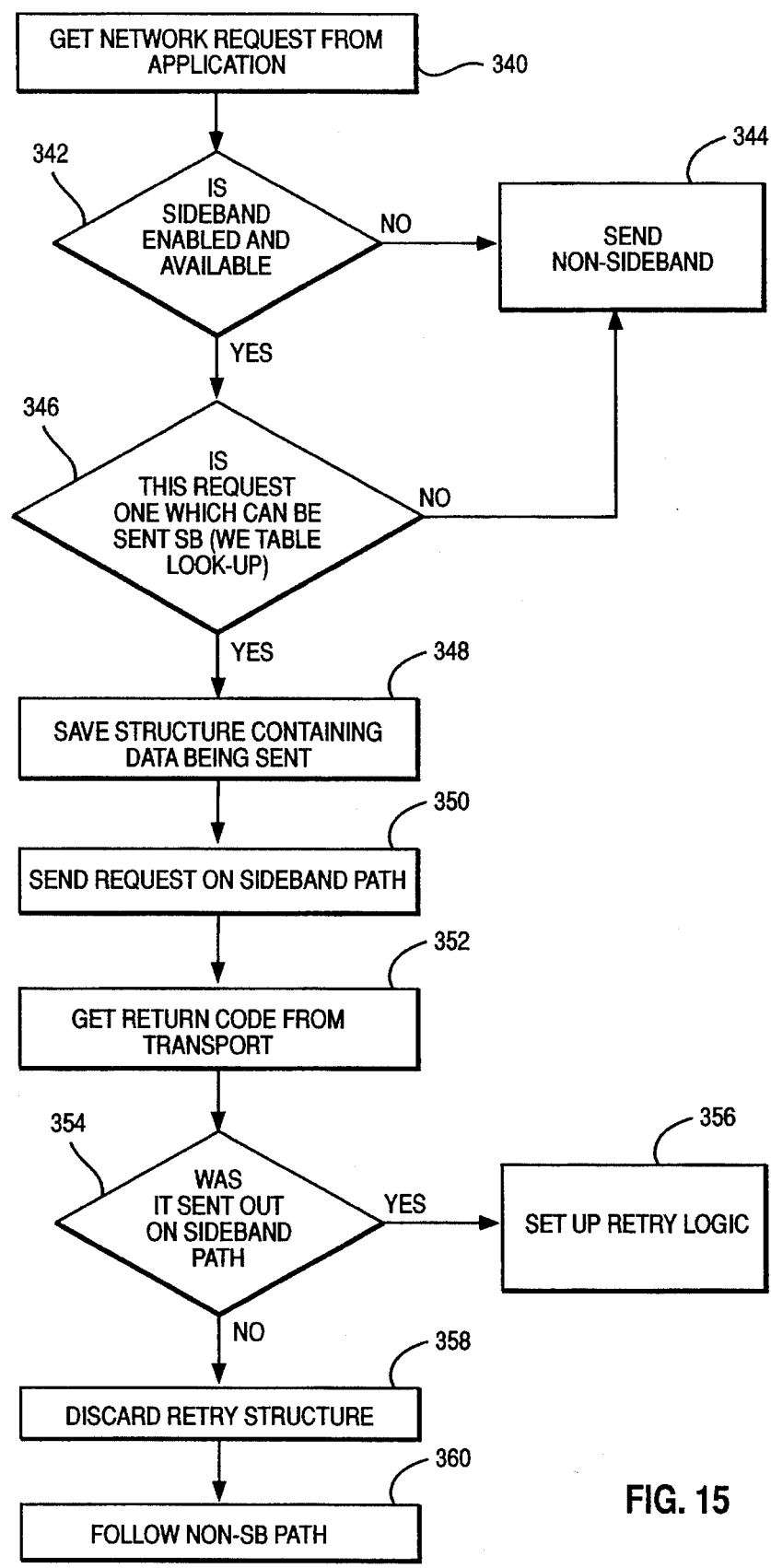
FIG. 15 is a flow diagram of the process where the LAN Application determines which messages to try to send via Sideband.

FIG. 15 is a flow diagram of one process by which a LAN application decides which messages to try to send Sideband. In step 340, a network request is received from one of the applications serviced by the LAN application. A test is performed in step 342 to determine whether Sideband is both enabled and available.

This is performed by referring to the Sideband enabled and available bits in the session data structure kept by the LAN Application. If Sideband is not enabled and available, the request is sent non-Sideband in step 344. If Sideband is both enabled and available, in step 346 a test is performed to determine whether this request is one which can be sent Sideband. A table lookup is performed to determine whether the Server Message Block (SMB) is one of those which is allowed to be sent Sideband. For LAN Server/LAN Requester, the allowable SMBs are presented in the table below.

Certain SMBs should not be sent Sideband: basically, any SMB which causes the state of the serve to change by sending it twice. One example would be creating a file. If a file is created, the server changes state by adding entries for the new file. If a second create is sent, more data structures are created on the server resulting in different state on the server. The second create, therefore, does not replay the first create. It essentially creates more structures on the server and affects the server state. A read, on the other hand, if it is read from the same offset, does not affect the server state and, therefore, can be sent twice with no harmful affect. Another example of a harmful SMB on retry is "open". Although open does not affect the state of the server physically, it affects the structure which it has opened, as it will increase the use count. It affects the use counts and open counts and affects, for example, when a file can be deleted.

One further example of an SMB command that cannot be sent are requests that could wait on the server for long periods of time. An example of this is a Blocking NAMED pipe operation.

If the message is not one which can be sent Sideband, the message is sent non-Sideband in step 344. If it can be sent Sideband, in step 348 the retry structure containing the data being sent is saved in the event that the Sideband send was unsuccessful. The retry structure largely comprises, a copy of the SMB originally sent Sideband. Next, in step 350, the request is sent to the protocol driver layer for a send on the Sideband path. In step 352, the return code is received back from the transport layer. The return code in step 352 may be of three types: standard error, for example, indicating that there is a resource problem, frame was successfully sent Sideband, or Sideband send was unsuccessful.

In step 354, a test is performed to determine whether the frame was actually sent out Sideband. While the LAN application determines whether the SMB is of the type that can be sent Sideband, as discussed above, the protocol driver also has input whether the SMB will be sent Sideband. The protocol driver layer will perform a test to determine whether the message can be sent in one frame or not. If the frame was sent Sideband, the retry logic is set up in step 356. The procedure for executing the retry logic is described in greater detail in FIG. 16. If the message was not sent out Sideband, in step 358 the retry structure is discarded as the non-Sideband protocol is reliable and in step 360 the LAN application enters a wait state to wait for a response from the receiving system.

The Server Message Blocks (SMBs) are well known messages which are used by the Network Operating System Applications manufactured by IBM, Microsoft, and DEC among others. According to the specifications of the SMB protocol, they require the use of a reliable session-oriented transmission protocol described in reference to FIGS. 4A and 5A above which is a reliable transport A more detailed description of SMBs listed below can be found in *X/Open Developer's Specification: Protocols for X/Open PC Interworking: SMB* (1991) X/Open Co. Ltd.

Below is a list of the Server Message Block (SMB) commands noting which are preferably sent in LAN Server code via Sideband. Other SMB commands may be sent in the future.

| SMB | OK for Sideband |
| --- | --- |
| SMBmkdir | |
| SMBrmdir | |
| SMBopen | |
| SMBcreate | |
| SMBclose | |
| SMBflush | |
| SMBunlink | |
| SMBmv | |
| SMBgetatr | Yes |
| SMBsetatr | Yes |
| SMBread | Yes |
| SMBwrite | Yes |
| SMBlock | |
| SMBunlock | |
| SMBctemp | |
| SMBmknew | |
| SMBchkpth | Yes |
| SMBexit | |
| SMBlseek | Yes |
| SMBtcon | |
| SMBtdis | |
| SMBnegprot | |
| SMBdskattr | Yes |
| SMBsearch | |
| SMBsplopen | |
| SMBsplwr | |
| SMBsplclose | |
| SMBsplretq | |
| SMBlockread | |
| SMBwriteunlock | |
| SMBreadBraw | |
| SMBreadBmpx | |
| SMBreadBs | |
| SMBwriteBraw | |
| SMBwriteBmpx | |
| SMBwriteBs | |
| SMBwriteC | |
| SMBsetattrE | Yes |
| SMBgetattrE | Yes |
| SMBlockingX | |
| SMBtrans | |
| SMBtranss | |
| SMBioctl | |
| SMBioctls | |
| SMBcopy | |
| SMBmove | |
| SMBecho | |

| SMB | OK for Sideband |
|---|---|
| SMBwriteclose | |
| SMBopenX | |
| SMBreadX | Yes |
| SMBwriteX | Yes |
| SMBcloseTD | |
| SMBtrans2 | |
| SMBtranss2 | |
| SMBfindclose | |
| SMBfindnclose | |
| SMBSessSetup | |
| SMBulogoff | |
| SMBTConX | |
| SMBfind | |
| SMBfunique | |
| SMBfclose | |
| SMBf2close | |

Figure 16:
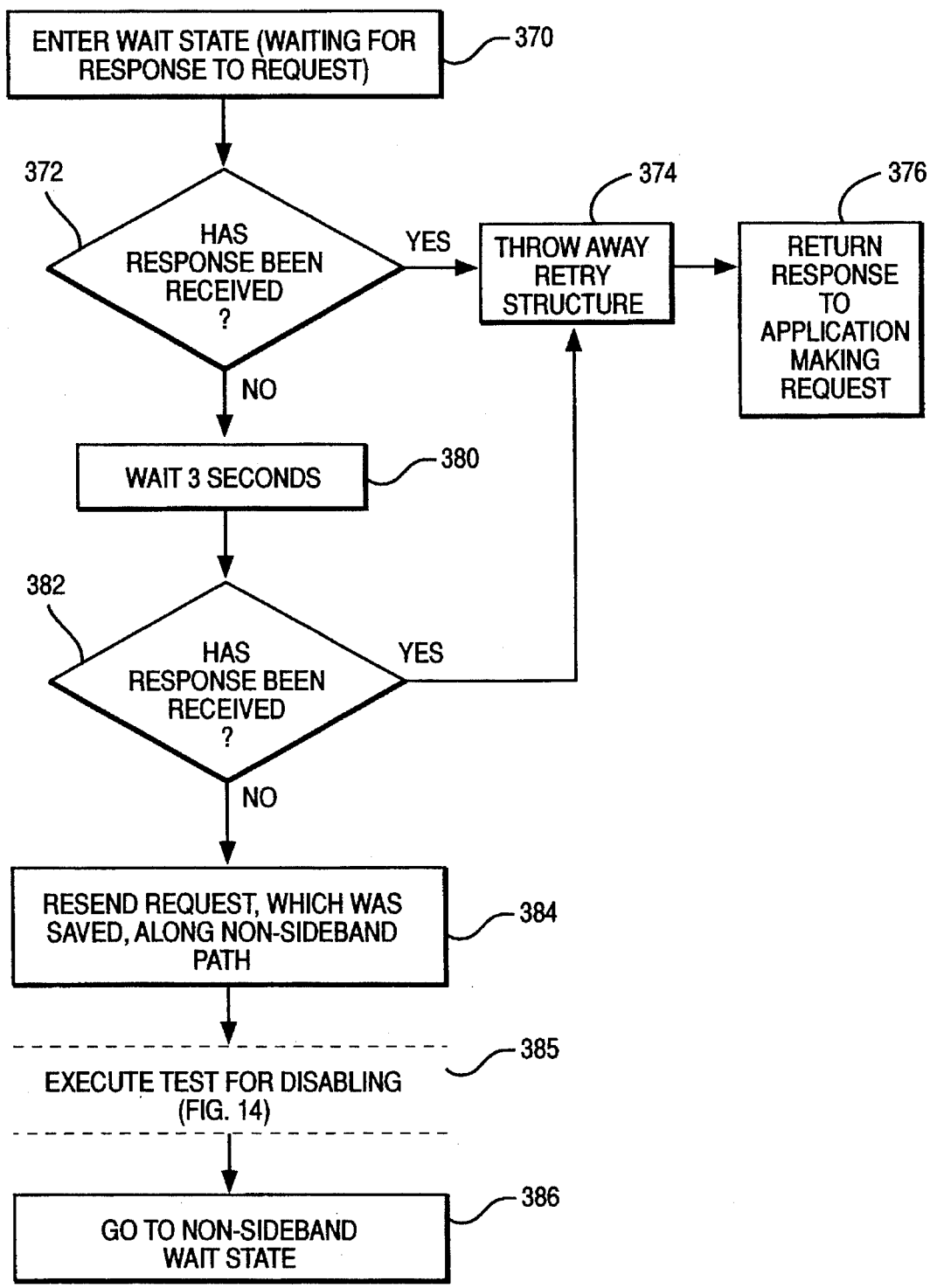
FIG. 16 is a flow diagram depicting the steps needed for determining whether a non-Sideband retry will be necessary.

The process sequence for determining whether a non-Sideband retry will be necessary is depicted in FIG. 16. In step 370, LAN Requester is in the wait state waiting for a response to the Sideband request. In step 372, a test is performed to determine whether the response has been received. If so, the retry structure is thrown away in step 374 and the appropriate response is returned to the LAN Requester Application making the initial request, in step 340 in FIG. 15. If the response has not yet been received, LAN Requester will wait for three seconds or some other predetermined period of time. A second test is performed to determine whether the response is received in step 382. If the response is received, steps 374 and 376 are performed. If the response has not been received, the request is now sent along a non-Sideband path, step 384. In step 385, a test is performed for disabling Sideband for that session. Please refer to FIG. 14. At this point, the LAN application enters a non-Sideband wait state in step 386 to wait for a response from the receiving system via the non-Sideband communications medium.

While the invention has been described using a particular fast, but unreliable transport called Sideband as defined above, it is not dependent on the use of Sideband. Another fast, unreliable transport medium such as a Datagram protocol which does not send a message to all system in the network may be used. The invention allows a LAN application to send messages which require guaranteed delivery over an unreliable transport using the existing reliable NetBIOS session transport as a backup in the event that the message is lost by Sideband. Although there is a certain amount of extra code which must be placed in the LAN Application, overall network performance is increased.

Applications in which all messages are stateless, i.e., double recepting by the receiving application will result in the same state as a single receptions, would not require a selection means to determine which of the messages to send Sideband. All of their messages could be sent Sideband, unless they do not meet the single frame criteria imposed by the protocol driver.

While the invention has been described with respect to particular embodiments above, it will be understood by those skilled in the art that modifications may be made without departing from the spirit and scope of the present invention. For example, in the embodiments above, Sideband is disabled and reenabled on a per session basis, i.e., on the entire requesting and receiving systems. It may be preferrable to disable and reenable Sideband on a per connection basis. For example, a single Requester may have two connections to a single server, one to a slow fixed disk and one to a fast fixed disk. It may be desirable to use SIDEBAND for READ and WRITE REQUESTS sent to the fast server disk resource, but REQUESTS to the slow server disk resource MAY be better sent NON-SIDEBAND. In this environment SIDEBAND could be ENABLED and DISABLED on a per DISK connection biasis. Sideband will still be available and enabled at the protocol driver. These embodiments are for purposes of example and illustration only and are not to be taken to limit the scope of the invention narrower than the scope of the appended claims.

We claim:

1. In a computer network having a plurality of nodes with one or more computer systems associated with a node, a system which incorporates a first application in a first computer system the first application requesting a protocol layer to send a first message to a second application of a second computer system over the network via a first, unreliable, session-oriented protocol, the first application comprising:

means for requesting the protocol layer to send the first message via the first protocol to the second application;

means for monitoring for a response to the first message by the second application, and, means for requesting the protocol layer to send the first message in a second, reliable protocol, protocol if the response by the second application is not received wherein the protocol layer sends the first message in the first and second protocol.

2. The system as recited in claim 1 in which the first application further comprises:

means for determining whether the first message belongs to first class of messages which can be sent via the first protocol such that a second reception of the first message by the second application will have no harmful effects on the network or a second class of messages in which a second reception of the message by the second application will have a harmful effect in the network; and, wherein the first message is sent via the first protocol if the first message belongs to the class.

3. The system as recited in claim 2 wherein the determining means classifies the first message according to whether a state of the second application after a double reception of the first message by the second application will be different than after a single reception of the first message.

4. The system as recited in claim 1 wherein the first application further comprises:

means for determining that the first protocol is available in a session between the first and second applications.

5. The system as recited in claim 1 which further comprises:

means for determining that the first protocol is enabled at the time the first message is to be sent.

6. The system as recited in claim 1 wherein in the first application further comprises:

means for storing the first message to send via the second protocol if the monitoring means does not receive the response from the second application.

7. The system as recited in claim 1 which further comprises:

means for monitoring the network to determine whether the network is sufficiently reliable to send the first message via the first protocol; and means for disabling the first protocol if the network monitoring means determines that the network is not sufficiently reliable.

8. The system as recited in claim 7 which further comprises:

means for reenabling the first protocol session if the network monitoring means determines that the network is sufficiently reliable.

9. In a computer network having a plurality of nodes with one or more computer systems associated with a node, a method carried out by a first application for requesting that a first message from the first application resident in a memory of a first computer system is to be sent by a protocol layer also in the memory of the first computer system to a second application resident in the memory of a second computer system over the network via a first, unreliable, session-oriented protocol comprising:

requesting the protocol layer to send the first message via the first protocol to the second application;

monitoring whether the first message was received by the second application; and, requesting the first message to be sent in a second, reliable protocol if the first message was apparently not received by the second application.

10. The method as recited in claim 9 which further comprises:

determining whether the first message belongs to a first class of messages which can be sent via the first protocol such that a retransmission of the first message to the second application will have no harmful effects on the network or a second class of messages in which a second receipton of the message by the second application will have a harmful effect in the network, and, wherein the first message is sent via the first protocol if the first message belongs to the class.

11. The method as recited in claim 10 wherein the determining step classifies the first message according to whether a state of the second application after a double reception of the first message by the second application will be different than after a single reception of the first message.

12. The method as recited in claim 9 of:

determining that the first protocol is available in a session between the first and second applications.

13. The method as recited in claim 9 which further comprises the step of:

determining that the first protocol is enabled at the time the first message is to be sent.

14. The method as recited in claim 9 the step of:

storing the first message to send via the second protocol if the monitoring means indicates that the first message was apparently not received by the second application.

15. The method as recited in claim 9 which further comprises the steps of:

monitoring the network to determine whether the network is sufficiently reliable to send the first message via the first protocol network; and disabling the first protocol in the session if the network monitoring means determines that the network is not sufficiently reliable.

16. The method as recited in claim 15 which further comprises the step of:

reenabling the first protocol if the network monitoring means determines that the network is sufficiently reliable.

17. For use in a computer network having a plurality of nodes with one or more computer systems associated with a node, a computer program product on a computer readable medium executable on a first computer for requesting that a first message from the product to a second application of a second computer system over the network via a first, unreliable, session-oriented protocol, the product when executed by the first computer in an application layer, comprising:

program code means for requesting the protocol layer to send the first message via the first protocol to the second application;

program code means for monitoring whether the first message was received by the second application; and, program code means for requesting the protocol layer to send the first message in a second, reliable protocol if the first message was apparently not received by the second application.

18. The product as recited in claim 17 which further comprises:

program code means for determining whether the first message belongs to a first class of messages which can be sent via the first protocol such that a retransmission of the first message to the second application will have no harmful effects on the network or a second class of messages in which a second reception of the message by the second application will have a harmful effect in the network; and, wherein the first message is sent via the first protocol if the first message belongs to the class.

19. The product as recited in claim 18 wherein the determining means classifies the first message according to whether a state of the second application after a double reception of the first message by the second application will be different than after a single reception of the first message.

20. The product as recited in claim 17 which further comprises:

program code means for determining that the first protocol is available in a session between the first and second applications.

21. The product as recited in claim 17 which further comprises:

program code means for determining that the first protocol is enabled at the time the first message is to be sent.

22. The product as recited in claim 17 which further comprises:

program code means for storing the first message if the monitoring means indicates that the first message was apparently not received by the second application.

23. The product as recited in claim 17 which further comprises:

program code means for monitoring the network to determine whether the network is sufficiently reliable to send the first message via the first protocol; and program code means for disabling the first protocol in the session if the network monitoring means determines that the network is not sufficiently reliable.

24. The product as recited in claim 23 which further comprises:

program code means for disabling the first protocol in the session if the network monitoring means determines that the network is not sufficiently reliable.

* * * * *